(12) United States Patent
Lu et al.

(10) Patent No.: US 11,135,565 B2
(45) Date of Patent: Oct. 5, 2021

(54) METAL ORGANIC FRAMEWORK (MOF) COMPOSITE MATERIALS, METHODS, AND USES THEREOF

(71) Applicant: UTI LIMITED PARTNERSHIP, Calgary (CA)

(72) Inventors: Qingye Lu, Calgary (CA); Omar Maan, Calgary (CA); Ping Song, Calgary (CA)

(73) Assignee: UTI Limited Partnership, Calgary (CA)

( * ) Notice: Subject to any disclaimer, the term of this patent is extended or adjusted under 35 U.S.C. 154(b) by 0 days.

(21) Appl. No.: 16/662,125

(22) Filed: Oct. 24, 2019

(65) Prior Publication Data
US 2020/0197901 A1 Jun. 25, 2020

Related U.S. Application Data

(60) Provisional application No. 62/750,591, filed on Oct. 25, 2018.

(51) Int. Cl.
| | | |
|---|---|---|
| *B01J 20/22* | (2006.01) |
| *B01J 20/30* | (2006.01) |
| *B01J 20/28* | (2006.01) |
| *C02F 1/28* | (2006.01) |
| *C02F 101/38* | (2006.01) |
| *C02F 101/20* | (2006.01) |
| *C02F 101/30* | (2006.01) |
| *C02F 101/34* | (2006.01) |

(52) U.S. Cl.
CPC ....... *B01J 20/226* (2013.01); *B01J 20/28047* (2013.01); *B01J 20/3085* (2013.01); *C02F 1/285* (2013.01); *C02F 2101/20* (2013.01); *C02F 2101/308* (2013.01); *C02F 2101/34* (2013.01); *C02F 2101/38* (2013.01)

(58) Field of Classification Search
CPC .............. B01J 20/226; B01J 20/3085; B01J 20/28047; C02F 1/281; C02F 1/285; C02F 1/288; C02F 2101/20; C02F 2101/308; C02F 2101/34; C02F 2101/38
See application file for complete search history.

(56) References Cited

FOREIGN PATENT DOCUMENTS

WO WO-2016100847 A2 * 6/2016 ............ A61K 47/34

OTHER PUBLICATIONS

Zhu, H., Zhang, Q., Zhu, S., "Alginate Hydrogel: A Shapeable and Versatile Platform for in Situ Preparation of Metal-Organic Framework-Polymer Composites", ACS Appl. Mater. Interfaces, 2016, 8, 17395-17401 (Year: 2019).*
Maan, O., Song, P., Chen., N., Lu, Q., An In Situ Procedure for the Preparation of Zeolitic Imidazolate Framework-8 Polyacrylamide Hydrogel for Adsorption of Aqueous Pollutants, Adv. Mater. Interfaces, 2019, 180195 (Year: 2019).*

(Continued)

*Primary Examiner* — James C Goloboy
(74) *Attorney, Agent, or Firm* — Clark & Elbing LLP

(57) ABSTRACT

There is described herein a metal organic framework (MOF) composite material, the composite material having a MOF entrapped within a hydrogel.

19 Claims, 20 Drawing Sheets
(19 of 20 Drawing Sheet(s) Filed in Color)

(56) References Cited

OTHER PUBLICATIONS

Ananthoji, R., Eubank, J.F., Nouar, F., Mouttaki, H., Eddaoudi, M, Harmon, J.P., "Symbiosis of zeolite-like metal-organic frameworks (rho-ZMOF) and hydrogels: Composites for controlled drug release", J. Mater. Chem., 2011,21,9587-9594 (Year: 2011).*

O'Neill, L.D., Zhang, H., Bradshaw, D., "Macro-/microporous MOF composite beads", J. Mater. Chem., 2010, 20, 5720-26 (Year: 2010).*

Allard et al., "A Comparative Study on the Chemical Composition of Humic Acids From Forest Soil, Agricultural Soil and Lignite Deposit Bound Lipid, Carbohydrate and Amino Acid Distributions," Geoderma. 130(1-2):77-96 (2006).

Bai et al., "Polypyrrole-Coated Granules for Humic Acid Removal," Journal of Colloid and Interface Science. 243(1):52-60 (2001).

Begam et al., "A Comparative Study of Swelling Properties of Hydrogels Based on Poly(Acrylamide-co-methyl Methacrylate) Containing Physical and Chemical Crosslinks," Journal of Applied Polymer Science. 89(3):779-786 (2003).

Benzaqui et al., "Toward an Understanding of the Microstructure and Interfacial Properties of PIMs ZIF-8 Mixed Matrix Membranes," ACS Applied Materials & Interfaces. 8(40):27311-27321 (2016).

Bhatnagar et al., "Removal of Natural Organic Matter (NOM) and Its Constituents From Water by Adsorption—A Review," Chemosphere. 166:497-510 (2017).

Burtch et al., "Water Stability and Adsorption in Metal-Organic Frameworks," Chemical Reviews. 114(20):10575-10612 (2014).

Cao et al., "Zinc Hydroxide Nanostrands: Unique Precursors for Synthesis of ZIF-8 Thin Membranes Exhibiting High Size-sieving Ability for Gas Separation," CrystEngComm. 16(42):9788-9791 (2014).

Chang and Juang., "Adsorption of Tannic Acid, Humic Acid, and Dyes From Water Using the Composite of Chitosan and Activated Clay," Journal of Colloid and Interface Science. 278(1):18-25 (2004).

Dai et al., "Fabrication of ZIF-9 Super-macroporous Microsphere for Adsorptive Removal of Congo Red From Water," RSC advances. 7(11):6288-6296 (2017).

Dias et al., "Towards the Use of Metal-organic Frameworks for Water Reuse: A Review of the Recent Advances in the Field of Organic Pollutants Removal and Degradation and the Next Steps in the Field," Journal of Materials Chemistry A. 3(45), 22484-22506 (2015).

Doulia et al., "Adsorption of Humic Acid on Acid-Activated Greek Bentonite," Journal of Colloid and Interface Science. 340(2):131-141 (2009).

Dragan et al., "Macroporous Composite Ipn Hydrogels Based on Poly (Acrylamide) and Chitosan With Tuned Swelling and Sorption of Cationic Dyes," Chemical Engineering Journal. 204:198-209 (2012).

Duchoslav et al., "XPZ study of zinc hydroxide as a potential corrosion product of zinc: Rapid X-ray induced conversion into zinc oxide," Corrosion Science. 82:356-361 (2014).

Fan et al., "Mechanically Strong Graphene Oxide Sodium Alginate Polyacrylamide Nanocomposite Hydrogel With Improved Dye Adsorption Capacity," Journal of Materials Chemistry A. 1(25):7433-7443 (2013).

Fazlifard et al., "Chitosan ZIF-8 Mixed-matrix Membranes for Pervaporation Dehydration of Isopropanol," Chemical Engineering & Technology. 40(4):648-655 (2017).

Feng et al., "Fast Adsorption of Methyl Blue on Zeolitic Imidazolate Framework-8 and Its Adsorption Mechanism," RSC Advances. 6(111):109608-109612 (2016).

Foo et al., "Insights into Modeling of Adsorption Isotherm Systems," Chemical Engineering Journal. 156(1): 2-10 (2010).

Giasuddin et al., "Adsorption of Humic Acid onto Nanoscale Zerovalent Iron and Its Effect on Arsenic Removal," Environmental Science & Technology. 41(6):2022-2027 (2007).

Gottschalk., "The Five-Parameter Logistic: A Characterization and Comparison With the Four-Parameter Logistic," Analytical Biochemistry. 343(1): 54-65 (2005).

Guesh et al., "Sustainable Preparation of MIL-100(Fe) and Its Photocatalytic Behavior in the Degradation of Methyl Orange in Water," Crystal Growth & Design. 17(4):1806-1813 (2017).

Guo et al., "Design of ZIF-8 Ion Copolymer Hierarchically Porous Material Coordination Effect on the Adsorption and Diffusion for Carbon Dioxide," Microporous and Mesoporous Materials. 261:79-87 (2018).

Hasan et al., "Removal of Hazardous Organics From Water Using Metal-Organic Frameworks (MOFs): Plausible Mechanisms for Selective Adsorptions," Journal of Hazardous Materials. 283:329-339 (2015).

He et al., "Facile synthesis of zeolitic imidazolate framework-8 from a concentrated aqueous solution," Microporous and Mesoporous Materials. 184:55-60 (2014).

Hendon et al., "Grand Challenges and Future Opportunities for Metal-Organic Frameworks," ACS Central Science. 3(6):554-563 (2017).

Hess et al., "MOF Channels within Porous Polymer Film: Flexible, Self-Supporting ZIF-8 Poly(ether sulfone) Composite Membrane," Chemistry of Materials. 28(21):7638-7644 (2016).

Holliman et al., "Model and Field Studies of the Degradation of Cross-linked Polyacrylamide Gels Used During the Revegetation of Slate Waste," Science of the Total Environment. 336 (1-3):13-24 (2005).

Holmes et al., "Estimation of Polyacrylamide Gel Pore Size From Ferguson Plots of Linear DNA Fragments. II. Comparison of Gels With Different Crosslinker Concentrations, Added Agarose and Added Linear Polyacrylamide," Electrophoresis. 12(9):612-619 (1991).

Hua et al., "Synthesis of Dimension-tunable Zno Nanostructures via the Design of Zinc Hydroxide Precursors," Applied Physics A. 102(2):275-280 (2010).

Huang et al., "Heavy Metal Ion Removal of Wastewater by Zeolite-imidazolate Frameworks," Separation and Purification Technology. 194:462-469 (2018).

Imyim et al., "Humic Acids Removal From Water by Aminopropyl Functionalized Rice Husk Ash," Journal of hazardous materials. 184(1-3):775-781 (2010).

Jian et al., "Adsorptive Removal of Arsenic From Aqueous Solution by Zeolitic Imidazolate Framework-8 (Zif-8) Nanoparticles," Colloids and Surfaces A: Physicochemical and Engineering Aspects. 465:67-76 (2015).

Jiang et al., "Zeolitic Imidazolate Framework-8 for Fast Adsorption and Removal of Benzotriazoles From Aqueous Solution," ACS Applied Materials & Interfaces. 5(19):9837-9842 (2013).

Jones et al., "Protein and Humic Acid Adsorption Onto Hydrophilic Membrane Surfaces Effects of Ph and Ionic Strength," Journal of Membrane Science. 165(1):31-46 (2000).

Jung et al., "Adsorptive Removal of P-arsanilic Acid From Water Using Mesoporous Zeolitic Imidazolate Framework-8," Chemical Engineering Journal. 267:9-15 (2015).

Kaur et al., "Synthesis and Characterization of ZIF-8 Nanoparticles for Controlled Release of 6-mercaptopurine Drug," Journal of Drug Delivery Science and Technology. 41:106-112 (2017).

Khan et al., "Adsorption and Removal of Phthalic Acid and Diethyl Phthalate From Water With Zeolitic Imidazolate and Metal-Organic Frameworks," Journal of Hazardous Materials. 282:194-200 (2015).

Kida et al., "Formation of High Crystalline ZIF-8 in an Aqueous Solution," CrystEngComm. 15(9):1794-1801 (2013).

Kim et al., "Characterization of Aquatic Humic Substances to DBPs Formation in Advanced Treatment Processes for Conventionally Treated Water," Journal of hazardous materials. 143(12):486-493 (2007).

Kim et al., "Graphene ZIF-8 Composites With Tunable Hierarchical Porosity and Electrical Conductivity," Journal of Materials Chemistry A. 4(20):7710-7717 (2016).

Knebel et al., "Comparative Study of MIL-96(Al) as Continuous Metal-Organic Frameworks Layer and Mixed-Matrix Membrane," ACS Applied Materials & Interfaces. 8(11):7536-7544 (2016).

(56) References Cited

OTHER PUBLICATIONS

Kruk et al., "Gas Adsorption Characterization of Ordered Organic-Inorganic Nanocomposite Materials," Chemistry of Materials. 13(10):3169-3183 (2001).

Kudasheva et al., "Pervaporation of Water ethanol Mixtures Through Polyimide Based Mixed Matrix Membranes Containing ZIF-8, Ordered Mesoporous Silica and ZIF-8-silica Core-shell Spheres," Journal of Chemical Technology & Biotechnology. 90(4):669-677 (2015).

Kumar et al., "Metal Organic Frameworks for Sensing Applications," TrAC Trends in Analytical Chemistry. 73:39-53 (2015).

Leng et al., "Adsorption Interaction Between a Metal-Organic Framework of Chromium-Benzenedicarboxylates and Uranine in Aqueous Solution," Colloids and Surfaces A: Physicochemical and Engineering Aspects. 441:164-169 (2014).

Li et al., "Porous Metal-Organic Frameworks for Gas Storage and Separation What, How, and Why'?," The Journal of Physical Chemistry Letters. 5(20):3468-3479 (2014).

Li et al., "Synthesis of ZIF-8 and ZIF-67 Using Mixed-base and Their Dye Adsorption," Microporous and Mesoporous Materials. 234:287-292 (2016).

Lim et al., "Diffusion Control in the in Situ Synthesis of Iconic Metal-Organic Frameworks within an Ionic Polymer Matrix," ACS Applied Materials & Interfaces. 10 (4):3793-3800 (2018).

Lin and Chang., "Efficient Adsorptive Removal of Humic Acid From Water Using Zeolitic Imidazole Framework-8 (ZIF-8)," Water, Air, & Soil Pollution. 226(2):10 (2015).

Lin et al., "Zirconium-based Metal Organic Frameworks Highly Selective Adsorbents for Removal of Phosphate From Water and Urine," Materials Chemistry and Physics. 160:168-176 (2015).

Liu and Zhou., "Removal of Humic Acid From Aqueous Solution Using Polyacrylamide Chitosan semi-IPN Hydrogel," Water Science and Technology. 2017(1):16-26 (2017).

Liu et al., "Integration of Nanosized ZIF-8 Particles Onto Mesoporous TiO 2 Nanobeads for Enhanced Photocatalytic Activity," RSC Adv. 7(13):8004-8010 (2017).

Liu et al., "Tio2-coated Natural Zeolite: Rapid Humic Acid Adsorption and Effective Photocatalytic Regeneration," Chemical Engineering Science. 105:46-52 (2014).

Mao et al., "Constructing Multifunctional MOF rGO Hydroaerogels by the Self-Assembly Process for Customized Water Remediation," Journal of Materials Chemistry A. 5(23):11873-11881 (2017).

Marquez et al., "Biocompatible Polymer-Metal-Organic Framework Composite Patches for Cutaneous Administration of Cosmetic Molecules," Journal of Materials Chemistry B. 4(43):7031-7040 (2016).

Peng., "Time-dependent Growth of Zinc Hydroxide Nanostrands and Their Crystal Structure," CheM Commun (Camb). (16):1904-1906 (2008).

Piccolo et al., "The Supramolecular Structure of Humic Substances a Novel Understanding of Humus Chemistry and Implications in Soil Science," Advances in Agronomy. 75:57-134 (2002).

Qin et al., "Adsorptive Removal of Bisphenol a From Aqueous Solution Using Metal-organic Frameworks," Desalination and Water Treatment. 54 (1):93-102 (2014).

Ran et al., "Zeolitic Imidazolate framework-8 (ZIF-8) as a Sacrificial Template: One-Pot Synthesis of Hollow Poly(dopamine) Nanocapsules and Yolk-Structured Poly(dopamine) Nanocomposites," Nanotechnology. 28(5):055604 (2017).

Raven., "XPS and Auger LMM analysis of ZnO/Si and ZnO/SiO2 interfaces," Surface and Interface Analysis. 1(1):20-25 (1979).

Rodenas et al., "Visualizing MOF Mixed Matrix Membranes at the Nanoscale Towards Structure-performance Relationships in CO2—CH4 Separation Over NH2—MIL-53 (AL) PI," Advanced Functional Materials. 24(2):249-256 (2014).

Ronning et al., "Carbon Nitride Deposited Using Energetic Species: a Review on Xps Studies," Physical Review.58(4):2207-2215 (1998).

Saha et al., "Photocatalytic Metal-Organic Framework From CdS Quantum Dot Incubated Luminescent Metallohydrogel," Journal of the American Chemical Society. 136(42):14845-14851 (2014).

Santos et al., "Adsorption in a Fixed-Bed Column and Stability of the Antibiotic Oxytetracycline Supported on Zn(II)-[2-Methylimidazolate] Frameworks in Aqueous Media," PLoS One. 10(6):e0128436 (2015).

Schejn et al., "Controlling ZIF-8 Nano-and Microcrystal Formation and Reactivity Through Zinc Salt Variations," CrystEngComm. 16(21):4493-4500 (2014).

Srivastava et al., "Studies on metal hydroxy compounds. II. Infrared spectra of zinc derivatives .-Zn(OH)2, β—ZnOHCI, ZnOHF, Zn5(OH)8Cl2, and Zn5(OH)8Cl2—H2O," Canadian Journal of Chemistry. 45(6):585-588 (1967).

Stellwagen., "Apparent Pore Size of Polyacrylamide Gels: Comparison of Gels Cast and Run in Tris-acetate-EDTA and Tris-borate-EDTA Buffers," Electrophoresis. 19(10):1542-1547 (1998).

Strohmeier et al., "Preparation and surface characterization of zincated aluminium memory-disc substrates," Journal of Materials Science. 28:1563-1572 (1993).

Sun et al., "Zeolitic Imidazolate Framework-8 as Efficient pH-Sensitive Drug Delivery Vehicle," Dalton Transactions. 41(23):6906-6909 (2012).

Tian et al., "Disinfection By-Products Formation and Precursors Transformation During Chlorination and Chloramination of Highly-Polluted Source Water: Significance of Ammonia," Water Research. 47(15):5901-5910 (2013).

Vikrant et al., "Metal-organic Frameworks (MOFs) Potential and Challenges for Capture and Abatement of Ammonia," Journal of Materials Chemistry A. 5(44):22877-22896 (2017).

Wang et al., "Adsorption of Low Concentration Humic Acid From Water by Palygorskite," Applied Clay Science. pp. 67-68 (2012).

Wang et al., "Humic Acid Adsorption on Fly Ash and Its Derived Unburned Carbon," Journal of colloid and interface science. 315(1):41-6 (2007).

Wang et al., "Zinc Imidazolate Metal-Organic Frameworks (ZIF-8) for Electrochemical Reduction of CO 2 to CO," Chemphyschem. 18(22):3142-3147 (2017).

Wong et al., "Designing Macroporous Polymers From Particle-Stabilized Foams," Journal of Materials Chemistry. 20(27):5628-5640 (2010).

Xiao et al., "A Cooperative Copper Metal-Organic Framework-Hydrogel System Improves Wound Healing in Diabetes," Advanced Functional Materials. 27(1):1604872 (2017).

Xiao et al., "Copper Metal-Organic Framework Nanoparticles Stabilized With Folic Acid Improve Wound Healing in Diabetes," ACS Nano. 12(2):1023-1032 (2018).

Xie et al., "Efficient Capture of Nitrobenzene From Waste Water Using Metal-Organic Frameworks," Chemical Engineering Journal. 246:142-149 (2014).

Yi et al., "Removal of Methylene Blue Dye From Aqueous Solution by Adsorption Onto Sodium Humate Polyacrylamide Clay Hybrid Hydrogels," Bioresour Technol. 99(7):2182-2186 (2008).

Yin et al., "Thermal Stability of Zif-8 Under Oxidative and Inert Environments a Practical Perspective on Using Zif-8 as a Catalyst Support," Chemical Engineering Journal. 278:293-300 (2015).

Zhang et al., "Agar Aerogel Containing Small-Sized Zeolitic Imidazolate Framework Loaded Carbon Nitride a Solar-Triggered Regenerable Decontaminant for Convenient and Enhanced Water Purification," ACS Sustainable Chemistry & Engineering. 5(10):9347-9354 (2017).

Zhang et al., "Coordination-driven in Situ Self-Assembly Strategy for the Preparation of Metal-Organic Framework Hybrid Membranes," Angewandte Chemie. 53(37):9775-9779 (2014).

Zhang et al., "Mechanisms and Kinetics of Humic Acid Adsorption Onto Chitosan-coated Granules," Journal of Colloid and Interface Science. 264(1):30-38 (2003).

Zhang et al., "Mesoporous Metal-Organic Frameworks With Size-, Shape, and Space-Distribution-Controlled Pore Structure," Advanced materials. 27(18):2923-2929 (2015).

Zhang et al., "Metal-Organic Frameworks Based Luminescent Materials for Nitroaromatics Sensing," CrystEngComm. 18(2):193-206 (2016).

(56) References Cited

OTHER PUBLICATIONS

Zhao et al., "Removal of Heavy Metal Ions From Aqueous Solutions by Adsorption Onto ZIF-8 Nanocrystals," Chemistry Letters. 44(6):758-760 (2015).

Zheng et al., "Shape Control in ZIF-8 Nanocrystals and Metal Nanoparticles ZIF-8 Heterostructures," Nanoscale. 9(43):16645-16651 (2017).

Zhou et al., "Adsorption Kinetic and Equilibrium Studies for Methylene Blue Dye by Partially Hydrolyzed Polyacrylamide Cellulose Nanocrystal Nanocomposite Hydrogels," Chemical Engineering Journal. 251:17-24 (2014).

Zhou et al., "Introduction to Metal-Organic Frameworks," Chemical Reviews. 112(2):673-674 (2012).

Zhu et al., "Alginate Hydrogel: A Shapeable and Versatile Platform for in Situ Preparation of Metal-Organic Framework-Polymer Composites," ACS Applied Materials & Interfaces. 8(27):17395-17401 (2016).

\* cited by examiner

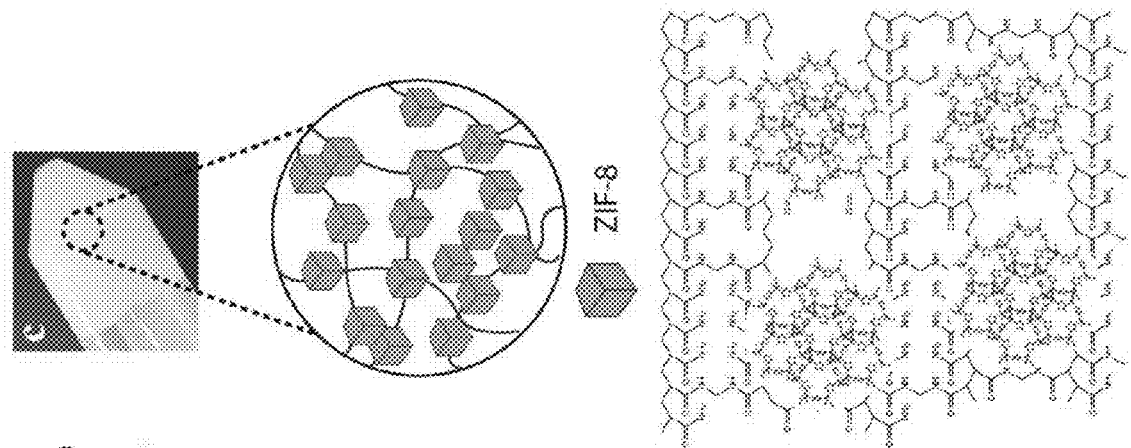
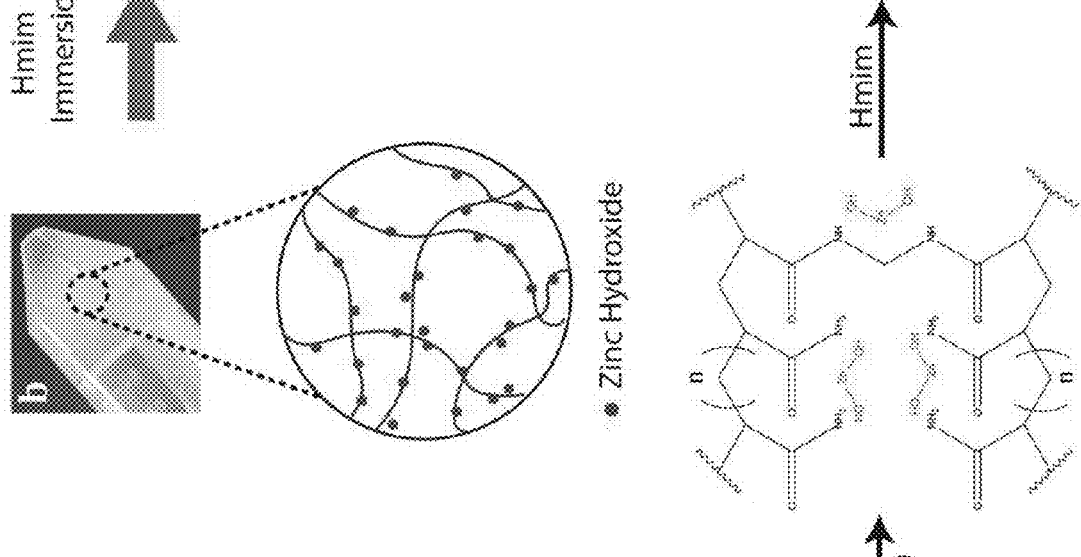
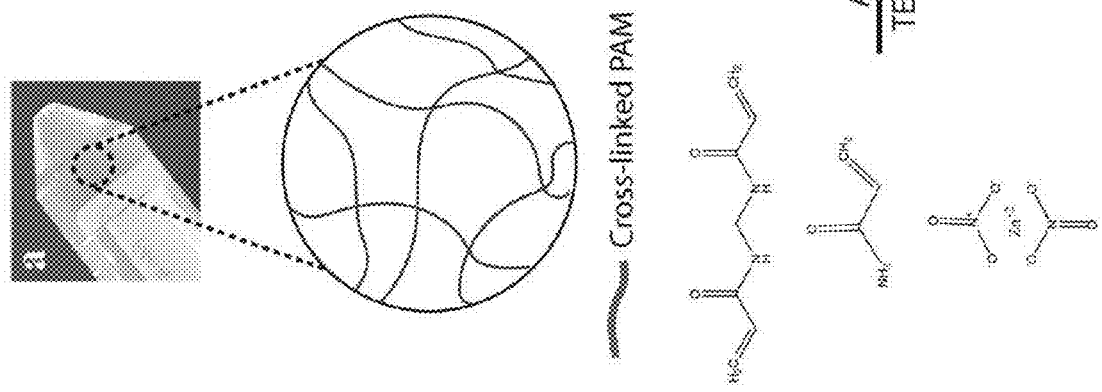

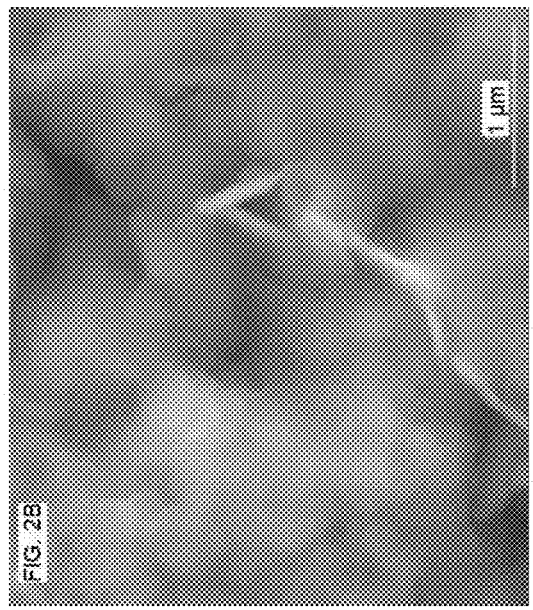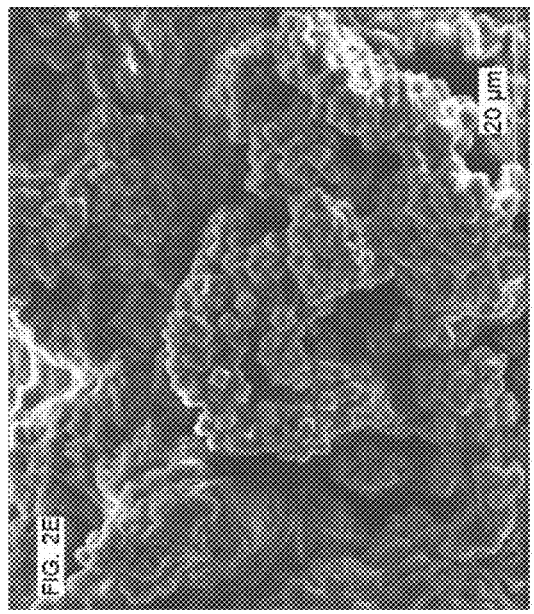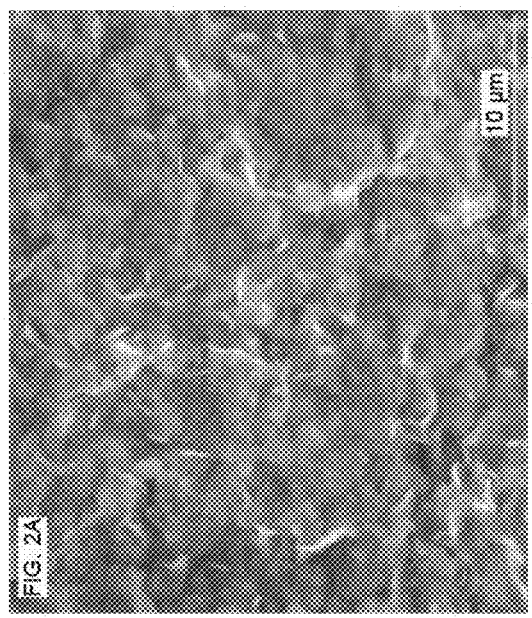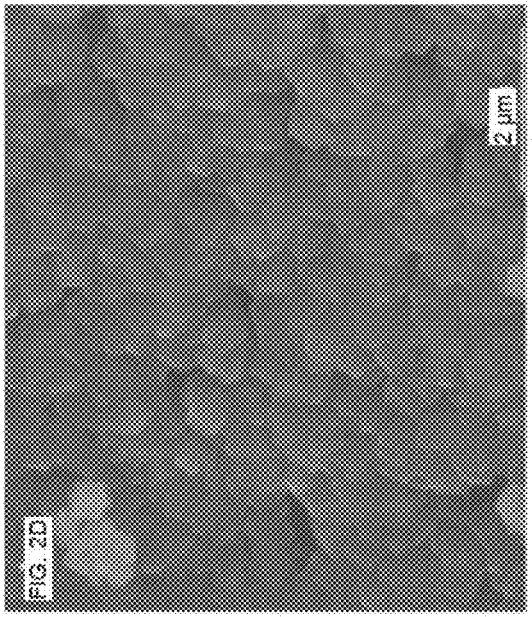

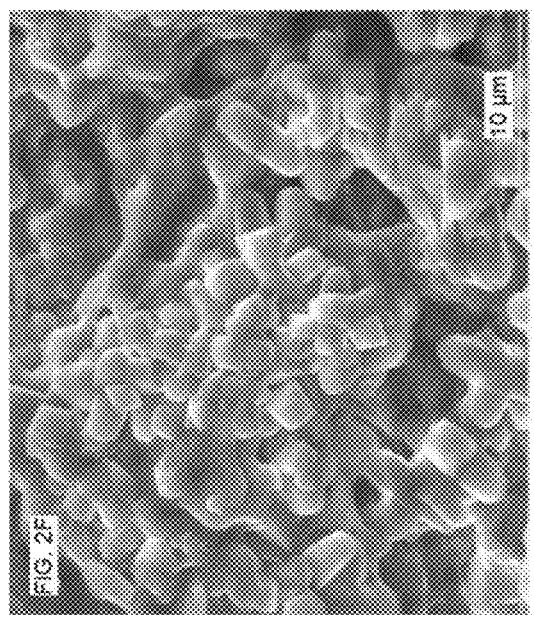
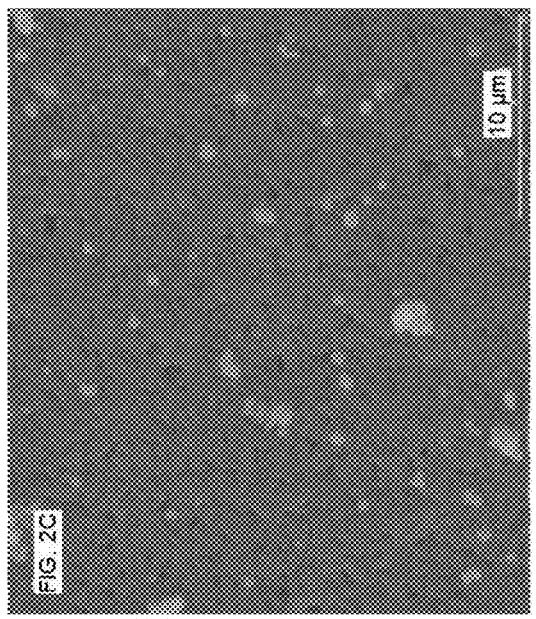

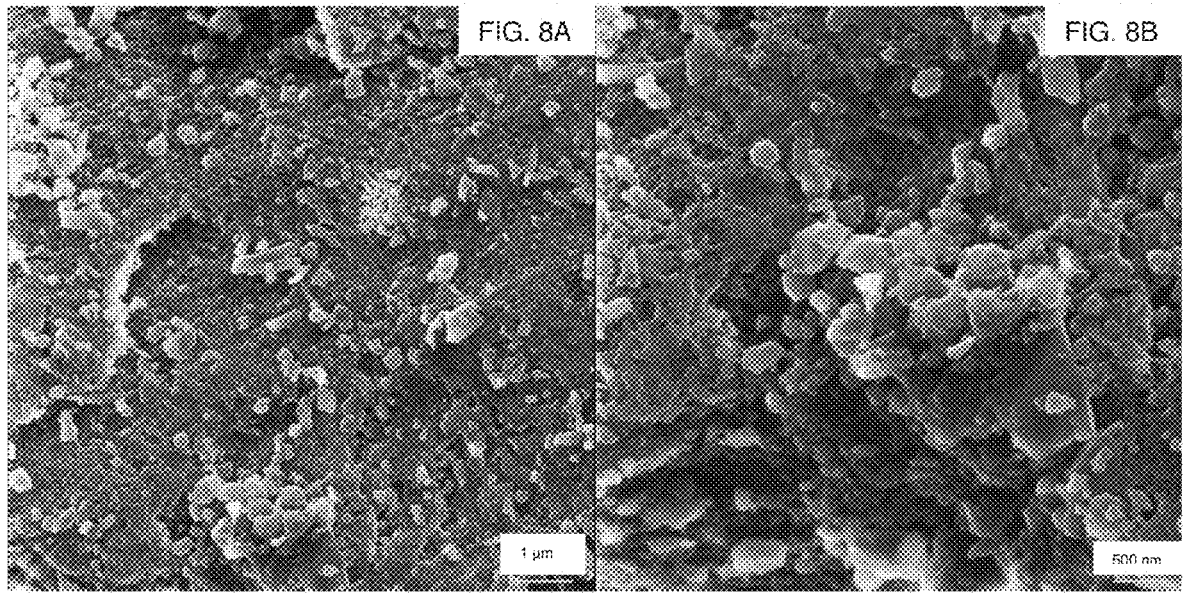
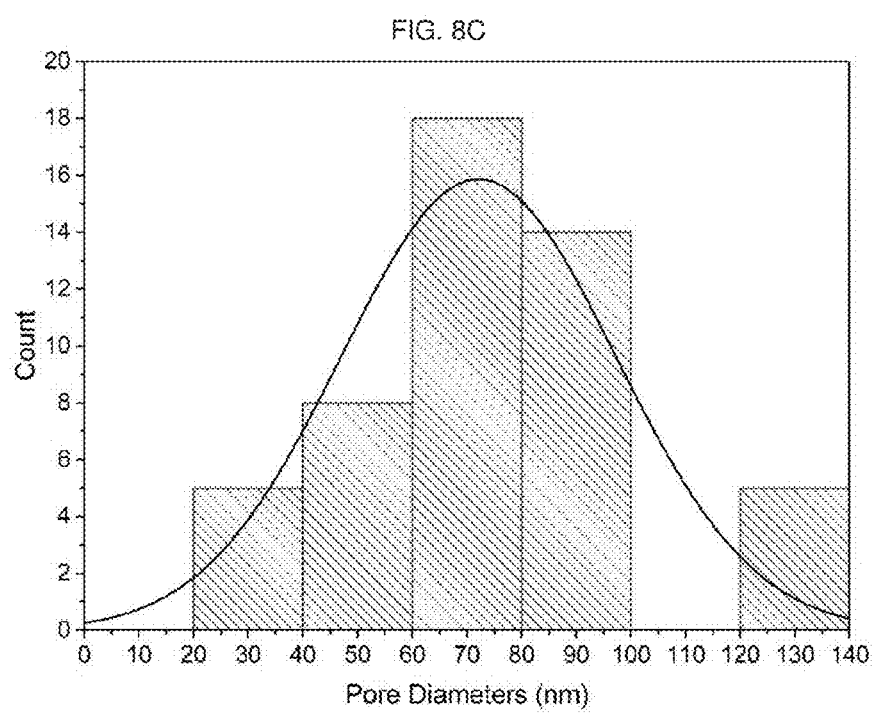

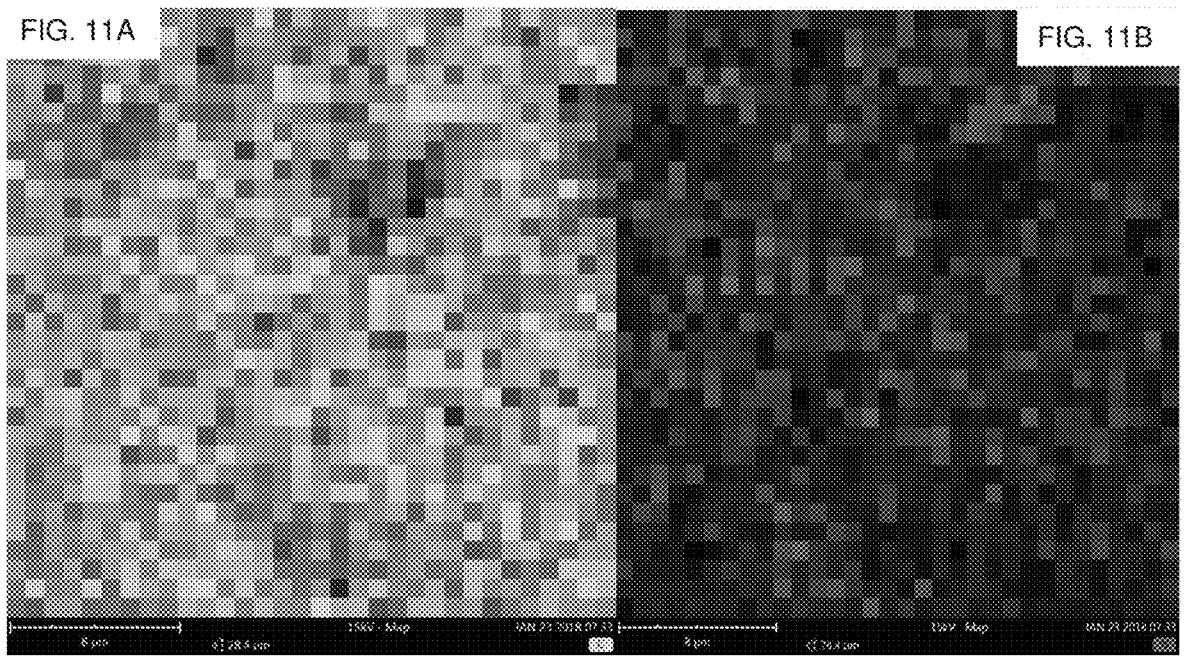
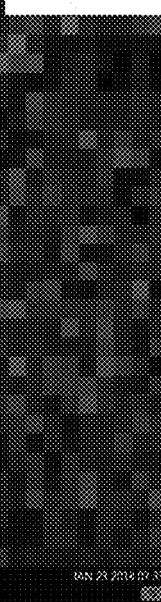
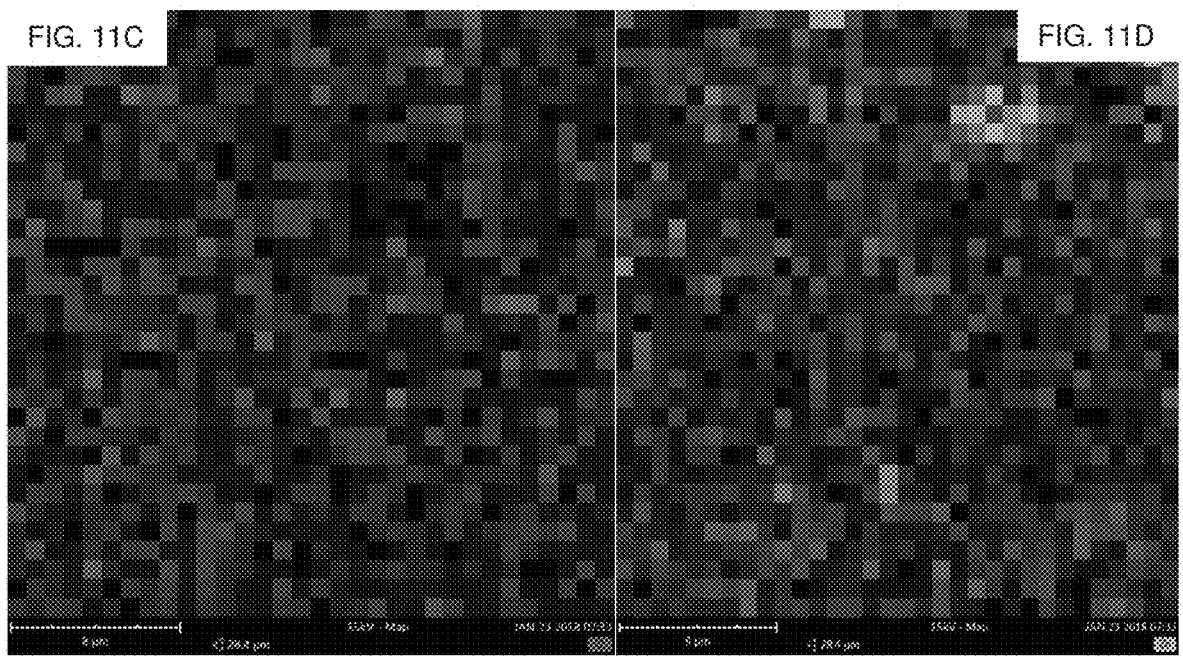

METAL ORGANIC FRAMEWORK (MOF) COMPOSITE MATERIALS, METHODS, AND USES THEREOF

FIELD

The present disclosure relates generally to composite materials. More particularly, the present disclosure relates to metal organic framework (MOF) composite materials, methods, and uses thereof.

BACKGROUND

Metal organic frameworks (MOFs) are porous crystalline materials constructed from the coordination of metal ions with organic ligands. MOFs demonstrate a set of unique characteristics such as high porosity, high surface area, tunable pore structure and size, as well as versatile functionalities depending on their inorganic and organic components [Zhou, H. C.; Long, J. R.; Yaghi, O. M., *Chem Rev* 2012, 112 (2), 673-4]. Particular focus has been placed on the use of MOFs for gas adsorption [Li, J.; Cao, W.; Mao, Y.; Ying, Y.; Sun, L.; Peng, X., *CrystEngComm* 2014, 16 (42), 9788-9791, Li, B.; Wen, H. M.; Zhou, W.; Chen, B., *J Phys Chem Lett* 2014, 5 (20), 3468-79., Guo, Q.; Chen, C.; Zhou, L.; Li, X.; Li, Z.; Yuan, D.; Ding, J.; Wan, H.; Guan, G., *Microporous and Mesoporous Materials* 2018, 261, 79-87], sensing [Zhang, L.; Kang, Z.; Xin, X.; Sun, D., *CrystEngComm* 2016, 18 (2), 193-206, Kumar, P.; Deep, A.; Kim, K.-H., *TrAC Trends in Analytical Chemistry* 2015, 73, 39-53], photocatalysis [Guesh, K.; Caiuby, C. A. D.; Mayoral, A.; Diaz-Garcia, M.; Diaz, I.; Sanchez-Sanchez, M., *Crystal Growth & Design* 2017, 17 (4), 1806-1813, Saha, S.; Das, G.; Thote, J.; Banerjee, R., *J Am Chem Soc* 2014, 136 (42), 14845-51, Zhang, W.; Shi, S.; Zhu, W.; Huang, L.; Yang, C.; Li, S.; Liu, X.; Wang, R.; Hu, N.; Suo, Y.; Li, Z.; Wang, J., *ACS Sustainable Chemistry & Engineering* 2017, 5 (10), 9347-9354], wound healing [Xiao, J.; Chen, S.; Yi, J.; Zhang, H.; Ameer, G. A., *Adv Funct Mater* 2017, 27 (1), Xiao, J.; Zhu, Y.; Huddleston, S.; Li, P.; Xiao, B.; Farha, O. K.; Ameer, G. A., *ACS Nano* 2018, 12 (2), 1023-1032], drug delivery [Sun, C. Y.; Qin, C.; Wang, X. L.; Yang, G. S.; Shao, K. Z.; Lan, Y. Q.; Su, Z. M.; Huang, P.; Wang, C. G.; Wang, E. B., *Dalton Trans* 2012, 41 (23), 6906-9, Marquez, A. G.; Hidalgo, T.; Lana, H.; Cunha, D.; Blanco-Prieto, M. J.; Àlvarez-Lorenzo, C.; Boissiére, C.; Sanchez, C.; Serre, C.; Horcajada, P., *Journal of Materials Chemistry B* 2016, 4 (43), 7031-7040, Kaur, H.; Mohanta, G. C.; Gupta, V.; Kukkar, D.; Tyagi, S., *Journal of Drug Delivery Science and Technology* 2017, 41, 106-112, Ran, J.; Xiao, L.; Wu, W.; Liu, Y.; Qiu, W.; Wu, J., *Nanotechnology* 2017, 28 (5), 055604], and contaminant removal from water [Huang, Y.; Zeng, X.; Guo, L.; Lan, J.; Zhang, L.; Cao, D., *Separation and Purification Technology* 2018, 194, 462-469, Mao, J.; Ge, M.; Huang, J.; Lai, Y.; Lin, C.; Zhang, K.; Meng, K.; Tang, Y., *Journal of Materials Chemistry A* 2017, 5 (23), 11873-11881, Dai, J.; Xiao, S.; Liu, J.; He, J.; Lei, J.; Wang, L., *RSC Advances* 2017, 7 (11), 6288-6296, Lin, K.-Y. A.; Chen, S.-Y.; Jochems, A. P., *Materials Chemistry and Physics* 2015, 160, 168-176, Lin, K.-Y. A.; Chang, H.-A., *Water, Air, & Soil Pollution* 2015, 226 (2), Jung, B. K.; Jun, J. W.; Hasan, Z.; Jhung, S. H., *Chemical Engineering Journal* 2015, 267, 9-15, Dias, E. M.; Petit, C., *Journal of Materials Chemistry A* 2015, 3 (45), 22484-22506]. MOFs are versatile adsorbents for the treatment of contaminated waters containing a variety of pollutants, with their adsorption being driven by electrostatic interactions, hydrogen bonding, Tr-Tr interactions/stacking, and acid-base interactions [Khan, N. A.; Jung, B. K.; Hasan, Z.; Jhung, S. H., *J Hazard Mater* 2015, 282, 194-200, Xie, L.; Liu, D.; Huang, H.; Yang, Q.; Zhong, C., *Chemical Engineering Journal* 2014, 246, 142-149, Qin, F.-X.; Jia, S.-Y.; Liu, Y.; Li, H.-Y.; Wu, S.-H., *Desalination and Water Treatment* 2014, 54 (1), 93-102, Leng, F.; Wang, W.; Zhao, X. J.; Hu, X. L.; Li, Y. F., *Colloids and Surfaces A: Physicochemical and Engineering Aspects* 2014, 441, 164-169, Hasan, Z.; Jhung, S. H., *J Hazard Mater* 2015, 283, 329-39].

A challenge for using MOFs as adsorbents in practical applications include high fabrication costs, thermal and chemical instability under extreme conditions, and limited recyclability [Vikrant, K.; Kumar, V.; Kim, K.-H.; Kukkar, D., *Journal of Materials Chemistry A* 2017, 5(44), 22877-22896, Hendon, C. H.; Rieth, A. J.; Korzynski, M. D.; Dinca, M., *ACS Cent Sci* 2017, 3 (6), 554-563, Burtch, N. C.; Jasuja, H.; Walton, K. S., *Chem Rev* 2014, 114 (20), 10575-612, Zhu, H.; Zhang, Q.; Zhu, S., *ACS Appl Mater Interfaces* 2016, 8 (27), 17395-401]. These limitations have fueled a study of material-supported MOFs, especially zeolitic imidazolate framework 8 (ZIF-8): one of the most popular MOF particles, which contains zinc ions tetrahedrally coordinated with four hydrophobic imidazole rings, and is stable in water [Burtch, N. C.; Jasuja, H.; Walton, K. S., *Chem Rev* 2014, 114 (20), 10575-612, Yin, H.; Kim, H.; Choi, J.; Yip, A. C. K., *Chemical Engineering Journal* 2015, 278, 293-300]. ZIF-8 is an excellent adsorbent for water contaminants such as p-arsanilic acid [Jung, B. K.; Jun, J. W.; Hasan, Z.; Jhung, S. H., *Chemical Engineering Journal* 2015, 267, 9-15], phthalic acid [Khan, N. A.; Jung, B. K.; Hasan, Z.; Jhung, S. H., *J Hazard Mater* 2015, 282, 194-200], benzotriazoles [Jiang, J. Q.; Yang, C. X.; Yan, X. P., *ACS Appl Mater Interfaces* 2013, 5 (19), 9837-42], and arsenic [Jian, M.; Liu, B.; Zhang, G.; Liu, R.; Zhang, X., *Colloids and Surfaces A: Physicochemical and Engineering Aspects* 2015, 465, 67-76]. Integration of ZIF-8 into multifunctional support matrices can make it easier to handle and recycle in water treatment compared to ZIF-8 powders. ZIF-8 has been combined with hydrogels such as alginate [Zhu, H.; Zhang, Q.; Zhu, S., *ACS Appl Mater Interfaces* 2016, 8 (27), 17395-401], reduced graphene oxide [Mao, J.; Ge, M.; Huang, J.; Lai, Y.; Lin, C.; Zhang, K.; Meng, K.; Tang, Y., *Journal of Materials Chemistry A* 2017, 5 (23), 11873-11881, Kim, D.; Kim, D. W.; Hong, W. G.; Coskun, A., *Journal of Materials Chemistry A* 2016, 4 (20), 7710-7717], amino-functionalized ion copolymer (PMAC) [Guo, Q.; Chen, C.; Zhou, L.; Li, X.; Li, Z.; Yuan, D.; Ding, J.; Wan, H.; Guan, G., *Microporous and Mesoporous Materials* 2018, 261, 79-87], chitosan [Fazlifard, S.; Mohammadi, T.; Bakhtiari, O., *Chemical Engineering & Technology* 2017, 40 (4), 648-655], polydopamine [Ran, J.; Xiao, L.; Wu, W.; Liu, Y.; Qiu, W.; Wu, J., *Nanotechnology* 2017, 28 (5), 055604], poly(ether sulfone) [Hess, S. C.; Grass, R. N.; Stark, W. J., *Chemistry of Materials* 2016, 28 (21), 7638-7644], and poly(sodium 4-styrenesulfonate) [Zhang, R.; Ji, S.; Wang, N.; Wang, L.; Zhang, G.; Li, J. R., *Angew Chem Int Ed Engl* 2014, 53 (37), 9775-9] in order to provide the MOF with stable support, as well as to enhance ZIF-8's adsorption capacity.

Integration of ZIF-8 into mixed matrix composite materials can be a laborious process involving reactions at different temperatures, as well as multiple steps for precursor preparations, and simple blending of pre-prepared ZIF-8 with polymers may lead to uneven dispersion and poor interactions between ZIF-8 and the supporting matrix [Benzaqui, M.; Semino, R.; Menguy, N.; Carn, F.; Kundu, T.; Guigner, J. M.; McKeown, N. B.; Msayib, K. J.; Carta, M.; Malpass-Evans, R.; Le Guillouzer, C.; Clet, G.; Ramsahye, N. A.; Serre, C.; Maurin, G.; Steunou, N., *ACS Appl Mater Interfaces* 2016, 8 (40), 27311-27321, Kudasheva, A.; Sorribas, S.; Zornoza, B.; Téllez, C.; Coronas, J., *Journal of Chemical Technology & Biotechnology* 2015, 90 (4), 669-677, Rodenas, T.; van Dalen, M.; Garcia-Perez, E.; Serra-Crespo, P.; Zornoza, B.; Kapteijn, F.; Gascon, J., *Advanced Functional Materials* 2014, 24 (2), 249-256, Knebel, A.; Friebe, S.; Bigall, N. C.; Benzaqui, M.; Serre, C.; Caro, J., *ACS Appl Mater Interfaces* 2016, 8 (11), 7536-44, Lim, J.; Lee, E. J.; Choi, J. S.; Jeong, N. C., *ACS Appl Mater Interfaces* 2018, 10 (4), 3793-3800]. Polyacrylamide (PAM) is used as the supporting hydrogel matrix since it is one of the most commonly used hydrophilic polymers in industry, it's relatively cheap, easy to synthesize, and has been successfully used in environmental remediation [Holliman, P. J.; Clark, J. A.; Williamson, J. C.; Jones, D. L., *Sci Total Environ* 2005, 336 (1-3), 13-24]. Studies of PAM hydrogel composites with cellulose nanocrystals, alginate, clay, and graphene oxide have demonstrated successful adsorption of dyes from water, with maximum capacities ranging from 2.5 to 25 mg/g [Zhou, C.; Wu, Q.; Lei, T.; Negulescu, I. I., *Chemical Engineering Journal* 2014, 251, 17-24, Fan, J.; Shi, Z.; Lian, M.; Li, H.; Yin, J., *Journal of Materials Chemistry A* 2013, 1 (25), Yi, J. Z.; Zhang, L. M., *Bioresour Technol* 2008, 99 (7), 2182-6]. PAM beads have also been combined with ZIF-8 and a copper based MOF, HKUST-1, for adsorption of heavy metal ions [Zhao, Y.; Pan, Y.; Liu, W.; Zhang, L., *Chemistry Letters* 2015, 44 (6), 758-760, O'Neill, L. D.; Zhang, H.; Bradshaw, D., *Journal of Materials Chemistry* 2010, 20 (27)]. However, these composites required complex microfluidic synthesis of the PAM beads, as well as seeding with pre-synthesized MOFs, and solvothermal secondary synthesis after initial seeding.

Humic acid (HA) is one of the main constituents of soil and a common organic pollutant found in surface, ground, and waste waters [Allard, B., *Geoderma* 2006, 130 (1-2), 77-96]. HA typically contains aromatic and carboxylic functional groups, making it negatively charged under natural pH conditions, and interacts with surrounding molecules by electrostatic, van der Waals force, rr-rr interaction, and hydrogen bonding [Bhatnagar, A.; Sillanpaa, M., *Chemosphere* 2017, 166, 497-510, Piccolo, A., *Adv Agron* 2002, 75, 57-134]. As a pollutant, HA presents a threat to the safety of drinking water because it can react during chlorination and disinfection processes to produce toxic and carcinogenic by-products, as well as binding to heavy metal ions [Kim, H. C.; Yu, M. J., *J Hazard Mater* 2007, 143 (1-2), 486-93, Tian, C.; Liu, R.; Liu, H.; Qu, J., *Water Res* 2013, 47 (15), 5901-10]. Given its potential hazard in the environment, studies have focused on developing new adsorptive materials for the removal of HA from water, including cellulose membranes, chitosan-coated granules, and clay composites [Jones, K. L.; O'Melia, C. R., *Journal of Membrane Science* 2000, 165 (1), 31-46, Zhang, X.; Bai, R., *Journal of Colloid and Interface Science* 2003, 264 (1), 30-38, Chang, M. Y.; Juang, R. S., *J Colloid Interface Sci* 2004, 278 (1), 18-25]. PAM/chitosan composites and pure ZIF-8 powder have also been shown to adsorb HA, with adsorption capacities of 166.3 mg/g and 70.2 mg/g at room temperature, respectively [Lin, K.-Y. A.; Chang, H.-A., *Water, Air, & Soil Pollution* 2015, 226 (2), Liu, Z.; Zhou, S., Removal of humic acid from aqueous solution using polyacrylamide/chitosan semi-IPN hydrogel. *Water Sci Technol* 2017, 2017 (1), 16-26].

SUMMARY

In an aspect of the present disclosure, there is provided a method of preparing a metal organic framework (MOF) composite material, the method comprising providing a metal precursor, a cross-linker, and a hydrogel monomer; polymerizing the hydrogel monomer in the presence of the metal precursor and the cross-linker to form an entrapped metal-hydrogel composite material; and exposing the entrapped metal-hydrogel composite material to an organic ligand to form an entrapped MOF-hydrogel composite material.

In an embodiment of the present disclosure, there is provided a method wherein providing the metal precursor, the cross-linker, and the hydrogel monomer comprises providing the metal precursor, the cross-linker, and the hydrogel monomer in a solution, and degassing the solution.

In another embodiment, there is provided a method wherein degassing the solution comprises degassing the solution under vacuum.

In another embodiment, there is provided a method wherein the solution is an aqueous solution.

In another embodiment, there is provided a method wherein polymerizing the hydrogel monomer in the presence of the metal precursor and the cross-linker comprises polymerizing the hydrogel monomer by free radical polymerization.

In another embodiment, there is provided a method wherein polymerizing the hydrogel monomer by free radical polymerization comprises initiating the polymerization with an initiator. In embodiments, the initiator is ammonium persulfate, or potassium persulfate.

In another embodiment, there is provided a method wherein initiating the polymerization with an initiator further comprises initiating the polymerization with a catalyst. In embodiments, the catalyst is tetramethylethylenediamine (TEMED), copper bipyridine, silver nitrate, dimethyl-piperazine, sodium thiosulfate, or UV light. In another embodiment, the catalyst is tetramethylethylenediamine (TEMED).

In another embodiment, there is provided a method wherein exposing the entrapped metal-hydrogel composite material to an organic ligand comprises providing a solution of the organic ligand; and immersing the entrapped metal-hydrogel composite material in the solution. In embodiments, immersing the entrapped metal-hydrogel composite material in the solution comprises immersing the entrapped metal-hydrogel composite for about 12 to about 24 hours; or for about 16 hours to about 24 hours; or for about 18 hours to about 24 hours; or for about 20 hours to about 24 hours; or for about 22 hours to about 24 hours. In embodiments, the solution is an aqueous solution.

In another embodiment, there is provided a method wherein the metal precursor, the cross-linker, and the hydrogel monomer are in a ratio of about 3:1:9, 6:1:9, 6:1:19, or 12:1:9. In embodiments, the ratio is about 6:1:9.

In another embodiment, there is provided a method wherein the metal precursor is a zinc precursor, a copper precursor, an iron precursor, or a combination thereof. In embodiments, the metal precursor is zinc nitrate hexahydrate, copper nitrate trihydrate, iron (III) chloride hexahydrate, or a combination thereof. In another embodiment, the metal precursor is a zinc precursor. In another embodiment, the metal precursor is zinc nitrate hexahydrate.

In another embodiment, there is provided a method wherein the cross-linker is bis-acrylamide, piperazine diacrylamide, diallyl-tartardiamide, dihydroxyethylene bis-acrylamide, bis-acrylylcystamine, or a combination thereof. In embodiments, a combination of cross-linkers may be more effective in providing mechanical strength to the composite material than a single cross-linker. In embodiments, the cross-linker is bis-acrylamide.

In another embodiment, there is provided a method wherein the hydrogel monomer is acrylamide, acrylonitrile, acryloxyethyltrimethyl ammonium chloride (DAC), methacryloxyethyltrimethyl ammonium chloride (DMC), dimethyldiallyammonium chloride (DMDAAC), sodium acrylate (SAA), or 2-acylamido-2-methyl propane sulfonic acid (AMPS). In embodiments, the hydrogel monomer is acrylamide.

In another embodiment, there is provided a method wherein the organic ligand is 2-methylimidazole (Hmim), trimesic acid, or a combination thereof. In embodiments, the organic ligand is 2-methylimidazole (Hmim). In embodiments, a combination of organic ligands may be used with a combination of metal precursors, as would be understood by a skilled person.

In another embodiment, there is provided a method wherein the hydrogel is polyacrylamide, polyacrylonitrile, poly(acryloxyethyltri methyl ammonium chloride), poly(methacryloxyethyltrimethyl ammonium chloride), poly(dimethyldiallyammonium chloride), sodium polyacrylate, poly(2-acylamido-2-methyl propane sulfonic acid), or co-polymers thereof.

In another embodiment, there is provided a method wherein the hydrogel is polyacrylamide.

In another embodiment, there is provided a method wherein the entrapped metal-hydrogel composite material comprises zinc hydroxide polyacrylamide, copper polyacrylamide, iron (III) polyacrylamide, zinc hydroxide polyacrylonitrile, copper polyacrylonitrile, iron (III) polyacrylonitrile, zinc hydroxide poly(acryloxyethyltrimethyl ammonium chloride), copper poly(acryloxyethyltrimethyl ammonium chloride), iron (III) poly(acryloxyethyltrimethyl ammonium chloride), zinc hydroxide poly(methacryloxyethyltrimethyl ammonium chloride), copper poly(methacryloxyethyltrimethyl ammonium chloride), iron (III) poly(methacryloxyethyltrimethyl ammonium chloride), zinc hydroxide poly(dimethyldiallyammonium chloride), copper poly(dimethyldiallyammonium chloride), iron (III) poly(dimethyldiallyammonium chloride), zinc hydroxide sodium polyacrylate, copper sodium polyacrylate, iron (III) sodium polyacrylate, zinc hydroxide poly(2-acylamido-2-methyl propane sulfonic acid, copper poly(2-acylamido-2-methyl propane sulfonic acid, iron (III) poly(2-acylamido-2-methyl propane sulfonic acid, or a combination thereof. In embodiments, the entrapped metal-hydrogel composite material comprises zinc hydroxide polyacrylamide.

In another embodiment, there is provided a method wherein the MOF is zeolitic imidazolate framework 8 (ZIF-8), Hong Kong University of Science and Technology MOF (HKUST-1), or MIL-100(Fe), or a combination thereof. In embodiments, the MOF is zeolitic imidazolate framework 8 (ZIF-8).

In another aspect of the present disclosure, there is provided a metal organic framework (MOF) composite material comprising a hydrogel; and a metal organic framework (MOF); the MOF being entrapped in the hydrogel.

In an embodiment of the present disclosure, there is provided a composite material wherein the hydrogel is polyacrylamide, polyacrylonitrile, poly(acryloxyethyltrimethyl ammonium chloride), poly(methacryloxyethyltrimethyl ammonium chloride), poly(dimethyldiallyammonium chloride), sodium polyacrylate, poly(2-acylamido-2-methyl propane sulfonic acid), or co-polymers thereof In another embodiment, there is provided a composite material wherein the hydrogel is polyacrylamide.

In another embodiment, there is provided a composite material wherein the MOF is zeolitic imidazolate framework 8 (ZIF-8), or Hong Kong University of Science and Technology MOF (HKUST-1), or MIL-100(Fe), or a combination thereof. In embodiments, the MOF is zeolitic imidazolate framework 8 (ZIF-8).

In another embodiment, there is provided a composite material wherein the MOF being entrapped in the hydrogel comprises the MOF being retained within the matrix of the hydrogel and/or associated with the surface of the hydrogel.

In another embodiment, there is provided a composite material wherein the MOF being retained within the matrix of the hydrogel comprises the MOF being retained via physical entanglement with the matrix of the hydrogel and/or the surface of the hydrogel; or through an intermolecular attractive force between the MOF and the matrix of the hydrogel and/or the surface of the hydrogel. In embodiments, the intermolecular attractive force is a van der Waals force, a dipole-dipole interaction, an electrostatic attraction, hydrogen bonding, or a combination thereof.

In another embodiment, there is provided a composite material wherein the MOF being associated with the surface of the hydrogel comprises the MOF being retained within the matrix of the hydrogel and/or deposited on the surface of the hydrogel.

In another aspect of the present disclosure, there is provided a metal organic framework (MOF)-composite material comprising the reaction product of an entrapped metal-hydrogel composite material; and an organic ligand.

In an embodiment of the present disclosure, there is provided a composite material wherein the entrapped metal-hydrogel composite material comprises the reaction product of a metal precursor; a cross-linker; and a hydrogel monomer.

In another embodiment, there is provided a composite material wherein the metal precursor is a zinc precursor, a copper precursor, an iron precursor, or a combination thereof. In embodiments, the metal precursor is zinc nitrate hexahydrate, copper nitrate trihydrate, iron (III) chloride hexahydrate, or a combination thereof. In embodiments, the metal precursor is a zinc precursor. In embodiments, the metal precursor is zinc nitrate hexahydrate.

In another embodiment, there is provided a composite material wherein the cross-linker is bis-acrylamide, piperazine di-acrylamide, diallyl-tartardiamide, dihydroxyethylene bis-acrylamide, bis-acrylylcystamine, or a combination thereof. In embodiments, a combination of cross-linkers may be more effective in providing mechanical strength to the composite material than a single cross-linker. In embodiments, the cross-linker is bis-acrylamide.

In another embodiment, there is provided a composite material wherein the hydrogel monomer is acrylamide, acrylonitrile, acryloxyethyltrimethyl ammonium chloride (DAC), methacryloxyethyltrimethyl ammonium chloride (DMC), dimethyldiallyammonium chloride (DMDAAC), sodium acrylate (SAA), or 2-acylamido-2-methyl propane sulfonic acid (AMPS). In embodiments, the hydrogel monomer is acrylamide.

In another embodiment, there is provided a composite material wherein the organic ligand is 2-methylimidazole (Hmim), trimesic acid, or a combination thereof. In embodiments, a combination of organic ligands may be used with a combination of metal precursors, as would be understood by a skilled person.

In another embodiment, there is provided a composite material wherein the hydrogel is polyacrylamide, polyacrylonitrile, poly(acryloxyethyltrimethyl ammonium chloride), poly(methacryloxyethyltrimethyl ammonium chloride), poly(dimethyldiallyammonium chloride), sodium polyacrylate, poly(2-acylamido-2-methyl propane sulfonic acid), or co-polymers thereof.

In another embodiment, there is provided a composite material wherein the hydrogel is polyacrylamide.

In another embodiment, there is provided a composite material wherein the MOF is zeolitic imidazolate framework 8 (ZIF-8), Hong Kong University of Science and Technology MOF (HKUST-1), MIL-100(Fe), or a combination thereof. In embodiments, the MOF is zeolitic imidazolate framework 8 (ZIF-8).

In another aspect of the present disclosure, there is provided a use of the composite material described herein for adsorbing a pollutant.

In an embodiment of the present disclosure, there is provided a use wherein the pollutant is an organic compound, or a heavy metal. In another embodiment, the organic compound is humic acid, phthalic acid, dyes, or a combination thereof. In another embodiment the heavy metal is arsenic.

In another aspect of the present disclosure, there is provided a use of the composite material described herein for separation of gases.

In an embodiment of the present disclosure, there is provided a use wherein the gases include carbon dioxide, hydrogen gas, oxygen, nitrogen, methane, or a combination thereof.

In another aspect of the present disclosure, there is provided a use of the composite material described herein in oil separation.

In another aspect of the present disclosure, there is provided a use of the composite material described herein as a heat transfer material.

In another aspect of the present disclosure, there is provided a use of the composite material described herein for drug encapsulation.

In another aspect of the present disclosure, there is provided a use of the composite material described herein for controlled drug release.

In another aspect of the present disclosure, there is provided a use of the composite material described herein as an agricultural soil enhancer.

In another aspect of the present disclosure, there is provided a use of the composite material described herein for protein immobilization.

In another aspect of the present disclosure, there is provided a use of the composite material described herein for electrochemical reduction of gases.

In another embodiment of the present disclosure, there is provided a use wherein the electrochemical reduction of gases includes the electrochemical reduction of carbon dioxide to carbon monoxide.

In another aspect of the present disclosure, there is provided a use of the composite material described herein for photocatalysis.

In another aspect of the present disclosure, there is provided a use of the composite material described herein for pervaporation.

In another aspect of the present disclosure, there is provided a use of the composite material described herein an electro-conductive material.

In another aspect of the present disclosure, there is provided a use of the composite material described herein as a catalyst support.

In another aspect of the present disclosure, there is provided a use of the composite material described herein as a column packing material.

In another aspect of the present disclosure, there is provided a use of the composite material described herein as a filtration membrane.

In another aspect of the present disclosure, there is provided a use of the composite material described herein in electrical conductors or super capacitors.

In another aspect of the present disclosure, there is provided a use of the composite material described herein as an agricultural slow release system.

In another aspect of the present disclosure, there is provided a use of the composite material described herein in biocatalysis.

In another aspect of the present disclosure, there is provided a use of the composite material described herein in wastewater treatment.

In another aspect of the present disclosure, there is provided a use of the composite material made by the method described herein for adsorbing a pollutant.

In another embodiment of the present disclosure, there is provided a use wherein the pollutant is an organic compound, or a heavy metal. In another embodiment, the organic compound is humic acid, phthalic acid, dyes, or a combination thereof. In another embodiment, the heavy metal is arsenic.

In another aspect of the present disclosure, there is provided a use of the composite material made by the method described herein for separation of gases.

In another embodiment of the present disclosure, there is provided a use wherein the gases include carbon dioxide, hydrogen gas, oxygen, nitrogen, methane, or a combination thereof.

In another aspect of the present disclosure, there is provided a use of the composite material made by the method described herein in oil separation.

In another aspect of the present disclosure, there is provided a use of the composite material made by the method described herein as a heat transfer material.

In another aspect of the present disclosure, there is provided a use of the composite material made by the method described herein for drug encapsulation.

In another aspect of the present disclosure, there is provided a use of the composite material made by the method described herein for controlled drug release.

In another aspect of the present disclosure, there is provided a use of the composite material made by the method described herein as an agricultural soil enhancer.

In another aspect of the present disclosure, there is provided a use of the composite material made by the method described herein for protein immobilization.

In another aspect of the present disclosure, there is provided a use of the composite material made by the method described herein for electrochemical reduction of gases.

In another embodiment of the present disclosure, there is provided a use wherein the electrochemical reduction of gases includes the electrochemical reduction of carbon dioxide to carbon monoxide.

In another aspect of the present disclosure, there is provided a use of the composite material made by the method described herein for photocatalysis.

In another aspect of the present disclosure, there is provided a use of the composite material made by the method described herein for pervaporation.

In another aspect of the present disclosure, there is provided a use of the composite material made by the method described herein as an electro-conductive material.

In another aspect of the present disclosure, there is provided a use of the composite material made by the method described herein as a catalyst support.

In another aspect of the present disclosure, there is provided a use of the composite material made by the method described herein as a column packing material.

In another aspect of the present disclosure, there is provided a use of the composite material made by the method described herein as a filtration membrane.

In another aspect of the present disclosure, there is provided a use of the composite material made by the method described herein in electrical conductors or super capacitors.

In another aspect of the present disclosure, there is provided a use of the composite material made by the method described herein as an agricultural slow release system.

In another aspect of the present disclosure, there is provided a use of the composite material made by the method described herein in biocatalysis.

In another aspect of the present disclosure, there is provided a use of the composite material made by the method described herein in wastewater treatment.

BRIEF DESCRIPTION OF THE FIGURES

The application file contains at least one drawing executed in color. Copies of this patent or patent application with color drawings will be provided by the Office upon request and payment of the necessary fee.

Embodiments of the present disclosure will now be described, by way of example only, with reference to the attached Figures.

FIGS. 1A-1D depict synthesis of a hydrogel composite material. FIG. 1A depicts preparation of PAM hydrogel; Zn-PAM hydrogel (i.e., entrapped metal-hydrogel composite material) (FIG. 1 B); ZIF-8 PAM hydrogel composite material (i.e., entrapped MOF-hydrogel composite material) (FIG. 1C), and a representation of ZIF-8 PAM hydrogel (FIG. 1D).

FIGS. 2A-2F depict SEM images of Zn-PAM hydrogel (FIGS. 2A-2B); surface of a ZIF-8 PAM hydrogel composite material (FIGS. 2C-2D); and the inside of a cross-section of the ZIF-8 PAM hydrogel composite material (FIGS. 2E-2F).

(FIG. 3B) thermogravimetric analysis of pure PAM hydrogel (PAM, dotted blue), pure ZIF-8 powder (ZIF8, solid red), and ZIF-8 PAM hydrogel composite material (ZIF8PAM, dashed purple); (FIG. 3C) XRD pattern for the PAM hydrogel, pure ZIF-8, ZIF-8 PAM composite material, and Zn-PAM hydrogel; (FIG. 3D) Fourier transform infrared spectra for the PAM hydrogel (solid black), Zn-PAM hydrogel (dotted blue), and the ZIF-8 PAM hydrogel composite material (dashed red).

FIGS. 8A-8C depict scanning helium ion microscopy images of dried and powderized ZIF-8 PAM hydrogel composite materials at dimensions of 10×10 micron (FIG. 8A), and 5×5 micron (FIG. 8B), where the pore diameter distribution of 50 measured pores in the 5×5 micron image are shown in (FIG. 8C).

FIGS. 11A-11D depict energy-dispersive X-ray spectroscopy of the surface of the ZIF-8 PAM hydrogel composite material where (FIG. 11A) is the carbon signal, (FIG. 11B) is the nitrogen signal, (FIG. 11C) is the oxygen signal, and (FIG. 11D) is the zinc signal.

DETAILED DESCRIPTION

Figure 1D:
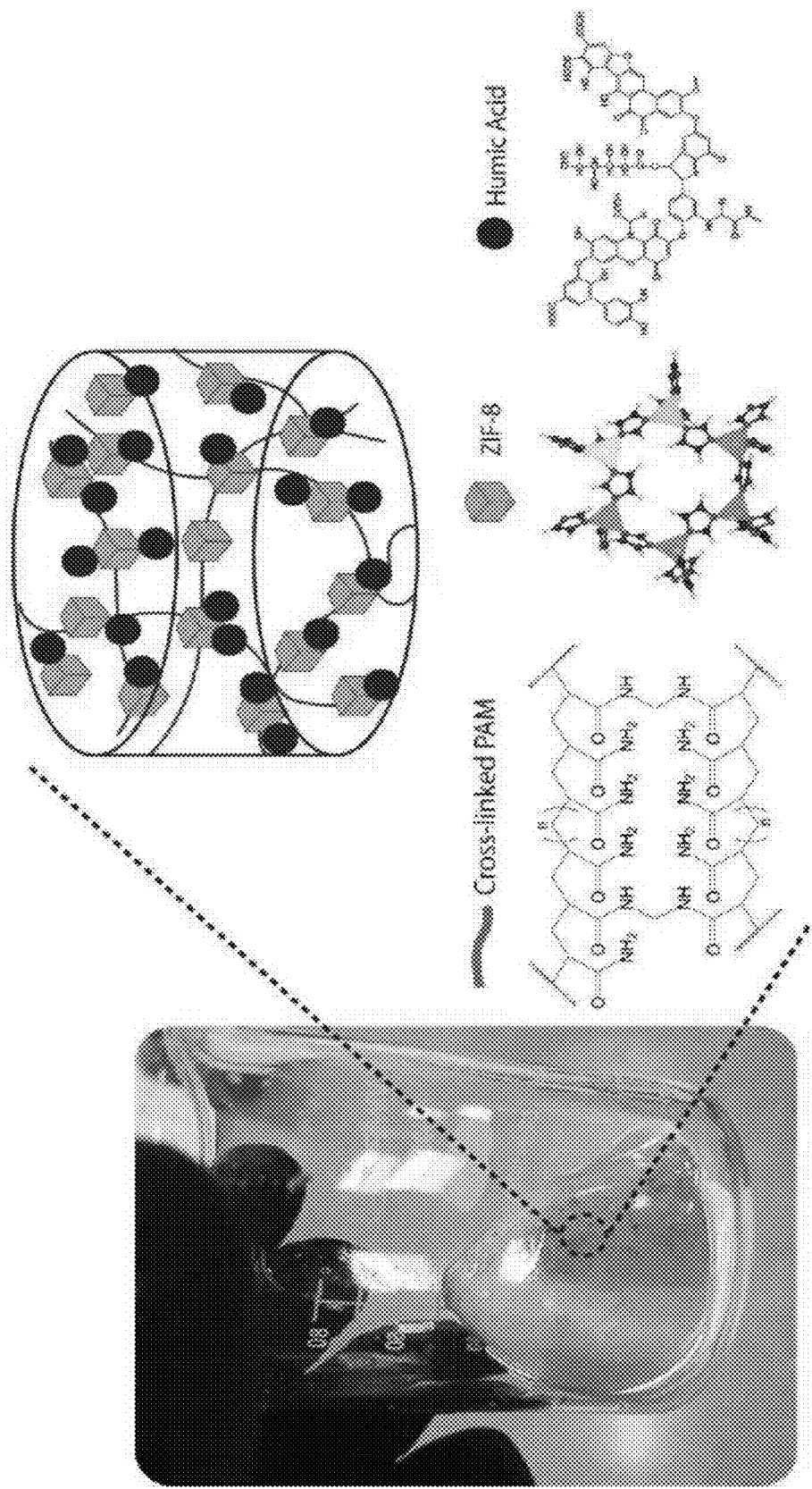

Unless defined otherwise, all technical and scientific terms used herein have the same meaning as commonly understood by one of ordinary skill in the art to which this invention belongs.

As used in the specification and claims, the singular forms "a", "an" and "the" 20 include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

Generally, the present disclosure describes a metal organic framework (MOF) composite material, and methods of making, and uses thereof.

In an example of the present disclosure, there is a method of preparing a metal organic framework (MOF) composite material, the method comprising providing a metal precursor, a cross-linker, and a hydrogel monomer; polymerizing the hydrogel monomer in the presence of the metal precursor and the cross-linker to form an entrapped metal-hydrogel composite material; and exposing the entrapped metal-hydrogel composite material to an organic ligand to form an entrapped MOF-hydrogel composite material.

In an example of the present disclosure, there is a method wherein providing the metal precursor, the cross-linker, and the hydrogel monomer comprises providing the metal precursor, the cross-linker, and the hydrogel monomer in a solution, and degassing the solution.

In another example, there is a method wherein degassing the solution comprises degassing the solution under vacuum.

In another example, there is a method wherein the solution is an aqueous solution.

In another example, there is a method wherein polymerizing the hydrogel monomer in the presence of the metal precursor and the cross-linker comprises polymerizing the hydrogel monomer by free radical polymerization.

In another example, there is a method wherein polymerizing the hydrogel monomer by free radical polymerization comprises initiating the polymerization with an initiator. In examples, the initiator is ammonium persulfate, or potassium persulfate.

In another example, there is a method wherein initiating the polymerization with an initiator further comprises initiating the polymerization with a catalyst. In examples, the catalyst is tetramethylethylenediamine (TEMED), copper bipyridine, silver nitrate, dimethyl-piperazine, sodium thiosulfate, or UV light. In another example, the catalyst is tetramethylethylenediamine (TEMED).

In another example, there is a method wherein exposing the entrapped metal-hydrogel composite material to an organic ligand comprises providing a solution of the organic ligand; and immersing the entrapped metal-hydrogel composite material in the solution. In examples, immersing the entrapped metal-hydrogel composite material in the solution comprises immersing the entrapped metal-hydrogel composite for about 12 to about 24 hours; or for about 16 hours to about 24 hours; or for about 18 hours to about 24 hours; or for about 20 hours to about 24 hours; or for about 22 hours to about 24 hours. In examples, the solution is an aqueous solution.

In another example, there is a method wherein the metal precursor, the cross-linker, and the hydrogel monomer are in a ratio of about 3:1:9, 6:1:9, 6:1:19, or 12:1:9. In examples, the ratio is about 6:1:9.

In another example, there is a method wherein the metal precursor is a zinc precursor, a copper precursor, an iron precursor, or a combination thereof. In examples, the metal precursor is zinc nitrate hexahydrate, copper nitrate trihydrate, iron (III) chloride hexahydrate, or a combination thereof. In another example, the metal precursor is a zinc precursor. In another example, the metal precursor is zinc nitrate hexahydrate.

In another example, there is a method wherein the cross-linker is bis-acrylamide, piperazine di-acrylamide, diallyltartardiamide, dihydroxyethylene bis-acrylamide, bis-acrylylcystamine, or a combination thereof. In examples, a combination of cross-linkers may be more effective in providing mechanical strength to the composite material than a single cross-linker. In examples, the cross-linker is bis-acrylamide.

In another example, there is a method wherein the hydrogel monomer is acrylamide, acrylonitrile, acryloxyethyltrimethyl ammonium chloride (DAC), methacryloxyethyltrimethyl ammonium chloride (DMC), dimethyldiallyammonium chloride (DMDAAC), sodium acrylate (SAA), or 2-acylamido-2-methyl propane sulfonic acid (AMPS). In examples, the hydrogel monomer is acrylamide.

In another example, there is a method wherein the organic ligand is 2-methylimidazole (Hmim), trimesic acid, or a combination thereof. In examples, the organic ligand is 2-methylimidazole (Hmim). In examples, a combination of organic ligands may be used with a combination of metal precursors, as would be understood by a skilled person.

In another example, there is a method wherein the hydrogel is polyacrylamide, polyacrylonitrile, poly(acryloxyethyltrimethyl ammonium chloride), poly(methacryloxyethyltrimethyl ammonium chloride), poly(dimethyldiallyammonium chloride), sodium polyacrylate, poly(2-acylamido-2-methyl propane sulfonic acid), or co-polymers thereof.

In another example, there is a method wherein the hydrogel is polyacrylamide.

In another example, there is a method wherein the entrapped metal-hydrogel composite material comprises zinc hydroxide polyacrylamide, copper polyacrylamide, iron (III) polyacrylamide, zinc hydroxide polyacrylonitrile, copper polyacrylonitrile, iron (III) polyacrylonitrile, zinc hydroxide poly(acryloxyethyltrimethyl ammonium chloride), copper poly(acryloxyethyltrimethyl ammonium chloride), iron (III) poly(acryloxyethyltrimethyl ammonium chloride), zinc hydroxide poly(methacryloxyethyltrimethyl ammonium chloride), copper poly(methacryloxyethyltrimethyl ammonium chloride), iron (III) poly(methacryloxyethyltrimethyl ammonium chloride), zinc hydroxide poly(dimethyldiallyammonium chloride), copper poly(dimethyldiallyammonium chloride), iron (III) poly(dimethyldiallyammonium chloride), zinc hydroxide sodium polyacrylate, copper sodium polyacrylate, iron (III) sodium polyacrylate, zinc hydroxide poly(2-acylamido-2-methyl propane sulfonic acid, copper poly(2-acylamido-2-methyl propane sulfonic acid, iron (III) poly(2-acylamido-2-methyl propane sulfonic acid, or a combination thereof. In examples, the entrapped metal-hydrogel composite material comprises zinc hydroxide polyacrylamide.

In another example, there is a method wherein the MOF is zeolitic imidazolate framework 8 (ZIF-8), Hong Kong University of Science and Technology MOF (HKUST-1), or MIL-100(Fe), or a combination thereof. In examples, the MOF is zeolitic imidazolate framework 8 (ZIF-8).

In another example of the present disclosure, there is a metal organic framework (MOF) composite material comprising a hydrogel; and a metal organic framework (MOF); the MOF being entrapped in the hydrogel.

In another example of the present disclosure, there is a composite material wherein the hydrogel is polyacrylamide, polyacrylonitrile, poly(acryloxyethyltrimethyl ammonium chloride), poly(methacryloxyethyltrimethyl ammonium chloride), poly(dimethyldiallyammonium chloride), sodium polyacrylate, poly(2-acylamido-2-methyl propane sulfonic acid), or co-polymers thereof.

In an example of the present disclosure, there is a composite material wherein the hydrogel is polyacrylamide.

In another example, there is a composite material wherein the MOF is zeolitic imidazolate framework 8 (ZIF-8), or Hong Kong University of Science and Technology MOF (HKUST-1), or MIL-100(Fe), or a combination thereof. In examples, the MOF is zeolitic imidazolate framework 8 (ZIF-8).

In another example, there is a composite material wherein the MOF being entrapped in the hydrogel comprises the MOF being retained within the matrix of the hydrogel and/or associated with the surface of the hydrogel.

In another example, there is a composite material wherein the MOF being retained within the matrix of the hydrogel comprises the MOF being retained via physical entanglement with the matrix of the hydrogel and/or the surface of the hydrogel; or through an intermolecular attractive force between the MOF and the matrix of the hydrogel and/or the surface of the hydrogel. In examples, the intermolecular attractive force is a van der Waals force, a dipole-dipole interaction, an electrostatic attraction, hydrogen bonding, or a combination thereof.

In another example, there is a composite material wherein the MOF being associated with the surface of the hydrogel comprises the MOF being retained within the matrix of the hydrogel and/or deposited on the surface of the hydrogel.

In another example of the present disclosure, there is a metal organic framework (MOF)-composite material comprising the reaction product of an entrapped metal-hydrogel composite material; and an organic ligand.

In an example of the present disclosure, there is a composite material wherein the entrapped metal-hydrogel composite material comprises the reaction product of a metal precursor; a cross-linker; and a hydrogel monomer.

In another example, there is a composite material wherein the metal precursor is a zinc precursor, a copper precursor, an iron precursor, or a combination thereof. In examples, the metal precursor is zinc nitrate hexahydrate, copper nitrate trihydrate, iron (III) chloride hexahydrate, or a combination thereof. In examples, the metal precursor is a zinc precursor. In examples, the metal precursor is zinc nitrate hexahydrate.

In another example, there is a composite material wherein the cross-linker is bis-acrylamide, piperazine di-acrylamide, diallyl-tartardiamide, dihydroxyethylene bis-acrylamide, bis-acrylylcystamine, or a combination thereof. In examples, a combination of cross-linkers may be more effective in providing mechanical strength to the composite material than a single cross-linker. In examples, the cross-linker is bis-acrylamide.

In another example, there is a composite material wherein the hydrogel monomer is acrylamide, acrylonitrile, acryloxyethyltrimethyl ammonium chloride (DAC), methacryloxyethyltrimethyl ammonium chloride (DMC), dimethyldiallyammonium chloride (DMDAAC), sodium acrylate (SAA), or 2-acylamido-2-methyl propane sulfonic acid (AMPS). In examples, the hydrogel monomer is acrylamide.

In another example, there is a composite material wherein the organic ligand is 2-methylimidazole (Hmim), trimesic acid, or a combination thereof. In examples, a combination of organic ligands may be used with a combination of metal precursors, as would be understood by a skilled person.

In another example, there is a composite material wherein the hydrogel is polyacrylamide, polyacrylonitrile, poly(acryloxyethyltri methyl ammonium chloride), poly(methacryloxyethyltrimethyl ammonium chloride), poly(dimethyldiallyammonium chloride), sodium polyacrylate, poly(2-acylamido-2-methyl propane sulfonic acid), or co-polymers thereof.

In another example, there is a composite material wherein the hydrogel is polyacrylamide.

In another example, there is a composite material wherein the MOF is zeolitic imidazolate framework 8 (ZIF-8), Hong Kong University of Science and Technology MOF (HKUST-1), MIL-100(Fe), or a combination thereof. In examples, the MOF is zeolitic imidazolate framework 8 (ZIF-8).

In another example of the present disclosure, there is a use of the composite material described herein for adsorbing a pollutant.

In an example of the present disclosure, there is a use wherein the pollutant is an organic compound, or a heavy metal. In another example, the organic compound is humic acid, phthalic acid, dyes, or a combination thereof. In another example, the heavy metal is arsenic.

In another example of the present disclosure, there is a use of the composite material described herein for separation of gases.

In an example of the present disclosure, there is a use wherein the gases include carbon dioxide, hydrogen gas, oxygen, nitrogen, methane, or a combination thereof.

In another example of the present disclosure, there is a use of the composite material described herein in oil separation.

In another example of the present disclosure, there is a use of the composite material described herein as a heat transfer material.

In another example of the present disclosure, there is a use of the composite material described herein for drug encapsulation.

In another example of the present disclosure, there is a use of the composite material described herein for controlled drug release.

In another example of the present disclosure, there is a use of the composite material described herein as an agricultural soil enhancer.

In another example of the present disclosure, there is a use of the composite material described herein for protein immobilization.

In another example of the present disclosure, there is a use of the composite material described herein for electrochemical reduction of gases.

In another example of the present disclosure, there is a use wherein the electrochemical reduction of gases includes the electrochemical reduction of carbon dioxide to carbon monoxide.

In another example of the present disclosure, there is a use of the composite material described herein for photocatalysis.

In another example of the present disclosure, there is a use of the composite material described herein for pervaporation.

In another example of the present disclosure, there is a use of the composite material described herein an electro-conductive material.

In another example of the present disclosure, there is a use of the composite material described herein as a catalyst support.

In another example of the present disclosure, there is a use of the composite material described herein as a column packing material.

In another example of the present disclosure, there is a use of the composite material described herein as a filtration membrane.

In another example of the present disclosure, there is a use of the composite material described herein in electrical conductors or super capacitors.

In another example of the present disclosure, there is a use of the composite material described herein as an agricultural slow release system.

In another example of the present disclosure, there is a use of the composite material described herein in biocatalysis.

In another example of the present disclosure, there is a use of the composite material described herein in wastewater treatment.

In another example of the present disclosure, there is a use of the composite material made by the method described herein for adsorbing a pollutant.

In another example of the present disclosure, there is a use wherein the pollutant is an organic compound, or a heavy metal. In another example, the organic compound is humic acid, phthalic acid, dyes, or a combination thereof. In another example, the heavy metal is arsenic.

In another example of the present disclosure, there is a use of the composite material made by the method described herein for separation of gases.

In another example of the present disclosure, there is a use wherein the gases include carbon dioxide, hydrogen gas, oxygen, nitrogen, methane, or a combination thereof.

In another example of the present disclosure, there is a use of the composite material made by the method described herein in oil separation.

In another example of the present disclosure, there is a use of the composite material made by the method described herein as a heat transfer material.

In another example of the present disclosure, there is a use of the composite material made by the method described herein for drug encapsulation.

In another example of the present disclosure, there is a use of the composite material made by the method described herein for controlled drug release.

In another example of the present disclosure, there is a use of the composite material made by the method described herein as an agricultural soil enhancer.

In another example of the present disclosure, there is a use of the composite material made by the method described herein for protein immobilization.

In another example of the present disclosure, there is a use of the composite material made by the method described herein for electrochemical reduction of gases.

In another example of the present disclosure, there is a use wherein the electrochemical reduction of gases includes the electrochemical reduction of carbon dioxide to carbon monoxide.

In another example of the present disclosure, there is a use of the composite material made by the method described herein for photocatalysis.

In another example of the present disclosure, there is a use of the composite material made by the method described herein for pervaporation.

In another example of the present disclosure, there is a use of the composite material made by the method described herein as an electro-conductive material.

In another example of the present disclosure, there is a use of the composite material made by the method described herein as a catalyst support.

In another example of the present disclosure, there is a use of the composite material made by the method described herein as a column packing material.

In another example of the present disclosure, there is a use of the composite material made by the method described herein as a filtration membrane.

In another example of the present disclosure, there is a use of the composite material made by the method described herein in electrical conductors or super capacitors.

In another example of the present disclosure, there is a use of the composite material made by the method described herein as an agricultural slow release system.

In another example of the present disclosure, there is a use of the composite material made by the method described herein in biocatalysis.

In another example of the present disclosure, there is a use of the composite material made by the method described herein in wastewater treatment.

Applications

Herein described MOF composite materials, comprising zeolitic imidazolate framework-8 (ZIF-8) formed from a tetrahedral coordination of zinc with nitrogen atoms of the imidazole rings (i.e., entrapped MOF-hydrogel composite material), may be used for: (i) adsorption of pollutants from water, including organic pollutants (e.g., humic acid, phthalic acid, dyes) and heavy metals (e.g., iron, copper, arsenic). ZIF-8 has been reported as an excellent adsorbents for organic pollutants and heavy metals in water. As a result, PAM/ZIF-8 composite materials can be very useful in water treatment with the adsorption property from ZIF-8 and easily operated feasibility from PAM.; (ii) gas separation, involving gases such as carbon dioxide, hydrogen gas, oxygen, nitrogen, or methane; (iii) oil separation; (iv) heat transfer material; (v) encapsulation and slow release of drugs; (vi) agricultural soil enhancer; (vii) biocatalyst and protein immobilization; (viii) electrochemical reduction of gasses, such as the reduction of $CO_2$ to CO; (ix) photocatalysis; (x) pervaporation; (xi) electroconductivity; (xii) membrane filtration; (xiii) catalyst support; and/or (xiv) column packing. As an adsorbent material, a ZIF-8 PAM composite material is used in bulk form (e.g., spheres, cubes) and placed directly in contaminated water to adsorb pollutants. Acting like a sponge, this composite material is then be easily removed from the water after the pollutants have been adsorbed. The ZIF-8 PAM composite material can be placed in a packing column (e.g., as beads) and contaminated water is run through the column for purification. The hydrogel supporting matrix can be shaped into a film or membrane filters, and gas separators may be lined with the composite material. As a soil enhancer, the composite material (e.g., as beads) are scattered directly on soil.

To gain a better understanding of the invention described herein, the following examples are set forth. It should be understood that these examples are for illustrative purposes only. Therefore, they should not limit the scope of this invention in anyway.

EXAMPLES

Example 1—Zeolitic Imidazolate Framework-8 Polyacrylamide Hydrogel: A Simple In-Situ Procedure for the Preparation of a Novel Composite Material for Adsorption of Organic Pollutants (i.e., Entrapped MOF-Hydrogel Composite Material)

Metal organic frameworks (MOFs) have attracted a lot of attention in recent years because of their excellent stability, high surface area and tunable porosities, which allow them to serve as good adsorbents for gases and organic water pollutants. One of the demanding challenges of using MOFs is that they need to be supported on a substrate or in a matrix in order for them to be easier to operate and be more efficiently used. Herein described is a simple in-situ method of synthesizing one of the most popular MOF particles, zeolitic imidazolate framework 8 (ZIF-8), in a polyacrylamide (PAM) hydrogel using a zinc hydroxide PAM composite (Zn-PAM) as a precursor gel. The synthesized ZIF-8 PAM composite hydrogels were characterized by SEM, EDS, XRD, FTIR, XPS to confirm the successful synthesis of mesoporous ZIF-8 particles on the surface of and inside the PAM hydrogel. Time-dependent adsorption curves for the adsorption of a model organic pollutant, humic acid (HA), by the ZIF-8 PAM composite hydrogel were obtained. The maximum adsorption capacity of ZIF-8 PAM for HA was found to be 111.5±3.0 mg/g ZIF8, and the adsorption isotherm was found to most closely follow a Hill's adsorption model, which suggested higher adsorption capacities could be achieved. ZIF-8 PAM was also tested for its ability to adsorb different kinds of dyes including cationic (methylene blue and rhodamine B), anionic (methyl orange), and neutral (isatin), and it was found that only methylene blue showed significant affinity to the ZIF-8 PAM composite hydrogel.

Described herein are methods for the in-situ growth of ZIF-8 crystals in a PAM hydrogel matrix. The in-situ method of ZIF-8 PAM hydrogels composite material was carried out at room temperature and through immersion of metal ion hydrogel precursors in a solution containing an organic ligand. Characterization using scanning electron microscopy (SEM), energy-dispersive X-ray spectroscopy (EDS), X-ray diffraction (XRD), X-ray photoelectron spectroscopy (XPS), and Fourier-transform infrared spectroscopy (FTIR) verified a successful synthesis of a ZIF-8 PAM hydrogel obtained through the in-situ method. Use of the thus synthesized composite material was tested as an adsorbent for contaminant removal from water; two types of organic contaminants were tested for adsorption isotherm, HA and dyes including cationic dyes (methylene blue, MB and rhodamine B, RB), an anionic dye (methyl orange, MO), and a neutral dye (isatin, IS).

Materials and Experimental Methods

Materials

Acrylamide ($C_3H_5NO$, ≥99.9%), N,N'-methylene-bis-acrylamide ($C_7H_{10}N_2O_2$, 99%), zinc nitrate hexahydrate ($Zn(NO_3)_2 \cdot 6H_2O$, purum, ≥98.0%), 2-methylimidazole ($C_4H_6N_2$, 99%), N,N,N',N'-tetramethylethylenediamine ($C_6H_{16}N_2$, TEMED), ammonium persulfate (($NH_4)_2S_2O_8$, ACS reagent, 98.0%), ethanol ($C_2H_5OH$, laboratory reagent, 96%), HA (CAS number 1415-93-6), rhodamine B ($C_{28}H_{31}ClN_2O_3$, HPCL, 95.0%), methyl orange ($C_{14}H_{14}N_3NaO_3S$, ACS reagent, 85.0%), isatin ($C_8H_5NO_2$, 97.0%), and methylene blue ($C_{16}H_{18}ClN_3S$) were from Sigma Aldrich and used as received. Sodium hydroxide (NaOH, pellets, certified ACS, 97.0%), hydrochloric acid (HCl, certified ACS Plus, 36.5 to 38.0% (w/w)), and methanol ($CH_3OH$, certified ACS, 99.8%) were from Fisher Scientific and used as received. All washing procedures and aqueous solution preparations were done using Milli-Q water (Millipore deionized with a resistivity of 18.2 MΩ·cm). Aqueous solution pH levels were modified using a combination of NaOH and HCl.

Synthesis of Zinc Hydroxide Polyacrylamide (Zn-PAM, an Entrapped Metal-Hydrogel Composite Material) and PAM Hydrogel A zinc hydroxide PAM (Zn-PAM) hydrogel (i.e., entrapped metal-hydrogel composite material) was synthesized by modifying PAM hydrogel preparation procedures outlined by Bio-Rad [Menter, P., Acrylamide *Electrophoresis*, 8]. Briefly speaking, the Zn-PAM hydrogel, with a monomer to cross-linker ratio of 9:1 (10% C), was made by dissolving 33.0 mg bis-acrylamide cross-linker, 297.0 mg acrylamide monomer, and 200 mg zinc nitrate hexahydrate in 10 mL of deionized (DI) water. The resultant monomer and zinc solution was then placed under vacuum to degas the solution for 20 minutes, followed by addition of a fresh mixture of 15 mg ammonium persulfate in 1 mL DI water and 20 µL of TEMED. The resultant solution was gently swirled, placed in a shaker at 200 RPM for 10 minutes, and allowed to react for 5 hours under ambient pressure at room temperature. The obtained Zn-PAM hydrogel was then washed and soaked in excess DI water twice to remove any remaining reagents. Monomer to cross-linker ratio and the amount of zinc nitrate hexahydrate were changed to vary the pore size of the gel and Zn loading, respectively. For comparison, PAM hydrogel was also prepared, following the same procedure without adding zinc nitrate hexahydrate.

Synthesis of ZIF-8 PAM Hydrogel (Entrapped MOF-Hydrogel Composite Material) and ZIF-8 Powder The washed Zn-PAM hydrogel (entrapped metal-hydrogel composite material) was transferred to a solution containing 800 mg of 2-methylimidazole (Hmim) in 50 mL of DI water and remained submerged in the solution for 24 hours to grow the ZIF-8 in the PAM hydrogel. Then the obtained ZIF-8 PAM composite material (i.e., entrapped MOF-hydrogel composite material) was removed, washed, and soaked in DI water to remove any remaining reagents. To determine the effects of reactant concentrations on ZIF-8 loading in the gel, hydrogels were synthesized with twice the amount of ZIF-8 reactants (400 mg of zinc nitrate hexahydrate and 1.6 g of 2-methylimidazole), and half the amount of reactants (100 mg of zinc nitrate hexahydrate and 400 mg of 2-methylimidaloze). For comparison, ZIF-8 powder was also prepared using the same ratio of zinc nitrate hexahydrate and 2-methylimidazole as in the ZIF-8 PAM hydrogel. 200 mg of $Zn(NO_3)_2 \cdot 6H_2O$ in methanol (50 mL) and 800 mg of Hmim in methanol (50 mL) were mixed under constant magnetic stirring and allowed to react for 24 hours. The resulting solution was centrifuged, and the obtained powder was washed with methanol 3 times and then dried at 70° C.

Characterization

The PAM hydrogel, Zn-PAM hydrogel (i.e., entrapped metal-hydrogel composite material), and ZIF-8/PAM hydrogel composite materials (i.e., entrapped MOF-hydrogel composite material) were freeze dried in a freeze dryer (FreeZone® Benchtop Freeze Dryer, Labconco, Mo., USA) for 48 hours, and then cut into chunks for scanning electron microscopy (SEM) imaging, energy-dispersive X-ray spectroscopy (EDS), and Brunauer-Emmett-Teller (BET) surface area and porosity analysis; or crushed into a fine powder using a pestle and mortar for X-ray diffraction (XRD), Fourier-transform infrared spectroscopy (FTIR), X-ray photoelectron spectroscopy (XPS), and thermogravimetric analysis (TGA). Images of the surface and cross section of the hydrogels were obtained using a FEI Quanta 250 field emission gun SEM (Thermo Fisher Scientific, Oregon, USA) in both large field detector (LFD) mode and electron backscatter diffraction (BSED) mode, at a voltage of 10 kV and at 50 Pa of pressure. EDS was done using both the previously mentioned SEM as well as a benchtop Phenom ProX SEM (Nano Science Instruments, Arizona, USA) at voltages of 10 kV and 15 kV respectively. Images showing porosity of the composite hydrogel were also obtained using the Zeiss Orion NanoFab helium-ion microscope at the University of Alberta's NanoFab facility. XRD (Rigaku Multiflex X-ray Diffractometer, 2 kW Cu Kα source) was allowed to run on an angular range of 4.5° to 70° at a sampling speed of 2°/min, a voltage of 40 kV, current of 20 mA, and a sampling window of 0.020. Powdered hydrogel samples were mixed with potassium bromide in a pestle and mortar then pelletized by using a pressurized press in order to be used in the FTIR (Thermo-Nicolet *Nexus* 470, GMI, Minnesota, USA). XPS was done using a Kratos Axis Ultra spectrometer (Kratos Axis 165) and results were processed using CasaXPS software. Surface area and porosity were measured using a Gemeni VII Surface Area Analyzer (Micromeritics, Georgia, USA). Dried hydrogel and composite samples were placed in the analyzer glass tube, degassed for 5 hours at 150° C., and the surface area and porosity were measured in a nitrogen environment at a temperature of 77 K. TGA was performed using a TGA/DSC 3+(Mettler Toledo, ON, Canada), where dried hydrogel and composite samples were heated from 25 to 1000° C. at 10° C./min in a nitrogen environment.

Hydrogel Swelling

Dried hydrogel samples were weighed then placed in excess DI water for 5 days to reach swelling equilibrium. Swollen hydrogels were weighed again and a swelling ratio was calculated using the following equation;

$$SR = \frac{W_s - W_d}{W_d}$$

Where SR is the swelling ratio, $W_s$ is the weight of the swollen hydrogel, and $W_d$ is the weight of the dry hydrogel. The swelling experiments were repeated in a basic environment where the pH of the DI water was adjusted from −7 to 10 with NaOH.

Humic Acid (HA) and Dye Absorption

As-synthesized hydrogels were used for HA and dye adsorption experiments. The hydrogels were placed in 200 mL solution of HA with concentrations ranging from 10 to 175 mg/L, or 0.01 mM MO, RhB, IS or MB for 7 days to reach adsorption equilibrium. Samples of HA or dye solutions were taken after 20 minutes of exposure to the ZIF-8 PAM hydrogel composite material, then every 45 minutes to obtain initial adsorption trends during the first 6 hours, and then every 24 hours to observe long term adsorption trends. Adsorption was measured using Ultra Violet-Visible Spectroscopy (UV-Vis, Cary 300, Agilent, California, USA), where spectra ranging from 190 nm to 900 nm were obtained for the solutions of HA, MO, RhB, IS, and MB in order to determine peak absorbance positions. The concentration in the solution was linearly related to the absorbance of light at a wavelength of 300 nm for HA, 465 nm for MO, 553.5 nm for RhB, 302 nm for IS, and 664 nm for MB, respectively. The isotherm of the HA adsorption onto ZIF-8 PAM hydrogel composite materials was modeled using the following Langmuir, Freundlich, modified Hill, and Five Parameter Logistic (5PL) equations:

$$q = \frac{q_{ml} k_L C_e}{1 + k_L C_e} \quad (1)$$

$$q = k_F C_e^{1/n} \quad (2)$$

$$q = q_o + \frac{(q_{mh} - q_o) C_e^n}{k_h^n + C_e^n} \quad (3)$$

$$q = q_o + \frac{(q_{m5} - q_o)}{\left(1 + \left(\frac{C_e}{C_o}\right)^{-a}\right)^b} \quad (4)$$

Where $g_{ml}$ is a maximum adsorption capacity as predicted by Langmuir, $k_L$ is a constant related to the affinity of an adsorbate to an adsorbent, $C_e$ is an equilibrium concentration, $k_F$ is a Freundlich constant related to the maximum adsorption capacity, $q_{mh}$ is a maximum adsorption capacity as predicted by the modified Hill model, $k_h$ is a dissociation constant in the Hill equation, $q_o$ is an initial base adsorption capacity, n is a constant related to an adsorption intensity, $q_{m5}$ is a maximum adsorption capacity as predicted by the 5PL equation, $C_o$ is an equilibrium concentration at which the maximum adsorption capacity is first reached, and the letters a and b are constants in the 5PL fitting [Dragan, E. S.; Lazar, M. M.; Dinu, M. V.; Doroftei, F., *Chemical Engineering Journal* 2012, 204-206, 198-209, Foo, K. Y.; Hameed, B. H., *Chemical Engineering Journal* 2010, 156 (1), 2-10, Gottschalk, P. G.; Dunn, J. R., *Anal Biochem* 2005, 343 (1), 54-65].

Adsorption of HA was also tested in basic solution environment (pH=10) following the above-mentioned procedure. To check recyclability of the hydrogels for adsorption of HA, the hydrogels were immersed in a strongly basic 1 mM solution of NaOH to reverse adsorption of HA. The NaOH solution was periodically changed every six hours and the hydrogels were washed with DI water. HA adsorption tests were then performed again with the recycled hydrogels to test re-usability.

Results and Discussion

Characterization of ZIF-8 PAM Hydrogel (Entrapped MOF-Hydrogel Composite Material)

Synthesis of ZIF-8 PAM hydrogel composite material was developed by making a precursor gel containing zinc metal ions from which ZIF-8 crystals could form once the gel was immersed in a ligand solution. As shown in FIG. 1, the base of this composite material was a PAM hydrogel, which was transparent and colorless, the Zn-PAM hydrogel was transparent with a white color, and the final ZIF-8 PAM hydrogel composite material was an opaque white. Characterization by SEM, EDS, BET, TGA, XRD, FTIR, and XPS (FIGS. 2-4, FIGS. 8-16, Tables 1-4 was performed to provide morphology and dimension, element distribution, surface area and porosity, crystal structure, chemical bonds, and element electronic state of the hydrogels and hydrogel composite materials, respectively. Such characterizations also aimed to provide some understanding of the crystal nucleation and growth during synthesis, as well as interactions among components in the ZIF-8 PAM hydrogel composite material.

SEM images (FIG. 2a-b) showed the presence of nano-strands composed of hexagonal zinc hydroxide clusters, which was consistent with the morphology of zinc hydroxide used as ZIF-8 precursors in literature [Li, J.; Cao, W.; Mao, Y.; Ying, Y.; Sun, L.; Peng, X., CrystEngComm 2014, 16 (42), 9788-9791, Peng, X.; Jin, J.; Kobayashi, N.; Schmitt, W.; Ichinose, I., Chem Commun (Camb) 2008, (16), 1904-6]. Addition of TEMED during the Zn-PAM hydrogel polymerization step created a basic environment in which $Zn(NO_3)_2$ converted to $Zn(OH)_2$ and facilitated formation of ZIF-8 crystals in the hydrogel matrix in aqueous conditions and without a need of nucleation initiators. The nano-strands had an average thickness of 67.7±9.1 nm. The surface of the ZIF-8 PAM composite material was densely packed with ZIF-8, with an average crystal size of 310.7±6.7 nm (FIGS. 2c-d). While the cross section images showed the inside of the hydrogel composite material contained much larger ZIF-8 crystals, with an average size of 1.12±0.03 μm (FIGS. 2e-f), the difference in size between the ZIF-8 on the surface and the crystals inside the hydrogel could be due to a greater amount of ammonium and secondary amine present inside the gel, which would allow for more reaction sites to facilitate formation of ZIF-8 [Zheng, G.; Chen, Z.; Sentosun, K.; Perez-Juste, I.; Bals, S.; Liz-Marzan, L. M.; Pastoriza-Santos, I.; Perez-Juste, J.; Hong, M., Nanoscale 2017, 9 (43), 16645-16651]. The size of ZIF-8 was also greatly dependent on the concentration of 2-methylimidazole (Hmim) during synthesis, where a greater ratio of Hmim to zinc leads to smaller ZIF-8 crystals [Kida, K.; Okita, M.; Fujita, K.; Tanaka, S.; Miyake, Y., CrystEngComm 2013, 15 (9)]. When the Zn-PAM hydrogel was placed in the Hmim solution, diffusion had to occur for the Hmim to reach the inside of the hydrogel and react with the zinc particles to form ZIF-8. Therefore, the effective concentration of Hmim inside the hydrogel was less than the concentration outside the hydrogel, leading to the formation of smaller ZIF-8 particles on the surface of the hydrogel. EDS performed on the cross-section of the ZIF-8 PAM hydrogel composite material showed strong signals of all the expected elements including carbon, nitrogen, oxygen, and zinc. The strong signal of zinc was present wherever carbon, nitrogen, and oxygen were present, as well as evenly distributed across the sample, indicating the ZIF-8 was densely packed in the hydrogel (FIG. 3a). EDS results for the surface of the ZIF-8 PAM hydrogel composite material showed similar results and even distribution of all signals indicating the ZIF-8 was densely packed on the surface as well (FIG. 11).

BET analysis (Table 1) showed an average pore diameter of 39.18±4.02 nm for the PAM hydrogel, which was consistent with previously reported values of 36-40 nm for PAM gels containing 10% C, and around 3% total acrylamide content [Stellwagen, N. C., Electrophoresis 1998, 19 (10), 1542-7, Holmes, D. L.; Stellwagen, N. C., Electrophoresis 1991, 12 (9), 612-9]. The surface area of the PAM hydrogel was 1.64±0.11 m$^2$/g which increased to 14.36±0.61 m$^2$/g in the ZIF-8 PAM hydrogel composite material due to the high surface area of the ZIF-8 crystals (Table 1). The pores of the ZIF-8 crystals in the hydrogel composite material were measured to be 5.56±0.47 nm in diameter on average (Table 1), which indicated the synthesis of a mesoporous type of ZIF-8, similar to those found in graphene/ZIF-8 composites [Kim, D.; Kim, D. W.; Hong, W. G.; Coskun, A., Journal of Materials Chemistry A 2016, 4 (20), 7710-7717]. The pore size distribution in the ZIF-8 PAM composite material shown in FIG. 10d gave a clearer idea of the range of pore sizes found in the composite material. A majority of the pores measured were between 2 and 10 nm wide, which belonged to the ZIF-8 particles densely packed on the surface of the composite materials. Pore size distribution also showed peaks for larger pores between 20 and 90 nm, which belonged to the PAM hydrogel and was consistent with the pore sizes seen in the helium ion microscopy images (helium ion images showed the porous structure of supporting PAM hydrogel, which was measured on the image to be an average of 72.10±3.55 nm in diameter; see FIG. 8). Hysteresis observed in the nitrogen isotherm for the ZIF-8 PAM hydrogel composite material was not found in microporous ZIF-8 samples 2 nm pore size), nor in other studies of composite ZIF-8 materials (FIG. 10a) [Zhu, H.; Zhang, Q.; Zhu, S., ACS Appl Mater Interfaces 2016, 8 (27), 17395-401, dos Santos Ferreira da Silva, J.; Lopez Malo, D.; Anceski Bataglion, G.; Nogueira Eberlin, M.; Machado Ronconi, C.; Alves Junior, S.; de Sa, G. F., PLoS One 2015, 10 (6), e0128436, Schejn, A.; Balan, L.; Falk, V.; Aranda, L.; Medjandi, G.; Schneider, R., CrystEngComm 2014, 16 (21), 4493-4500, He, M.; Yao, J.; Liu, Q.; Wang, K.; Chen, F.; Wang, H., Microporous and Mesoporous Materials 2014, 184, 55-60]. However, previous work has reported the presence of hysteresis loops in nitrogen adsorption isotherms of mesoporous ZIF-8 (2-50 nm pore size), as well as due to the macroporosity formed by packing of the ZIF-8 crystals on a supporting matrix [Liu, Q.; Zhou, B.; Xu, M.; Mao, G., RSC Advances 2017, 7 (13), 8004-8010, Zhang, W.; Liu, Y.; Lu, G.; Wang, Y.; Li, S.; Cui, C.; Wu, J.; Xu, Z.; Tian, D.; Huang, W.; DuCheneu, J. S.; Wei, W. D.; Chen, H.; Yang, Y.; Huo, F., Adv Mater 2015, 27 (18), 2923-9].

Figure 3B:
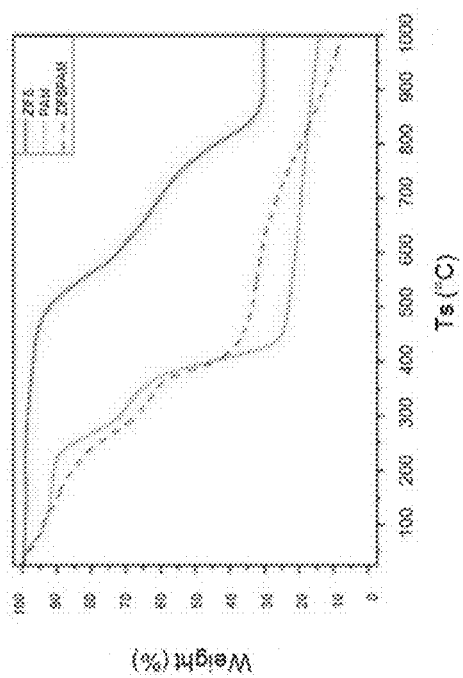
FIGS. 3A-3D depict (FIG. 3A) distribution of carbon, nitrogen, oxygen, and zinc inside a ZIF-8 PAM hydrogel from Energy-dispersive X-ray spectroscopy.
Figure 12:
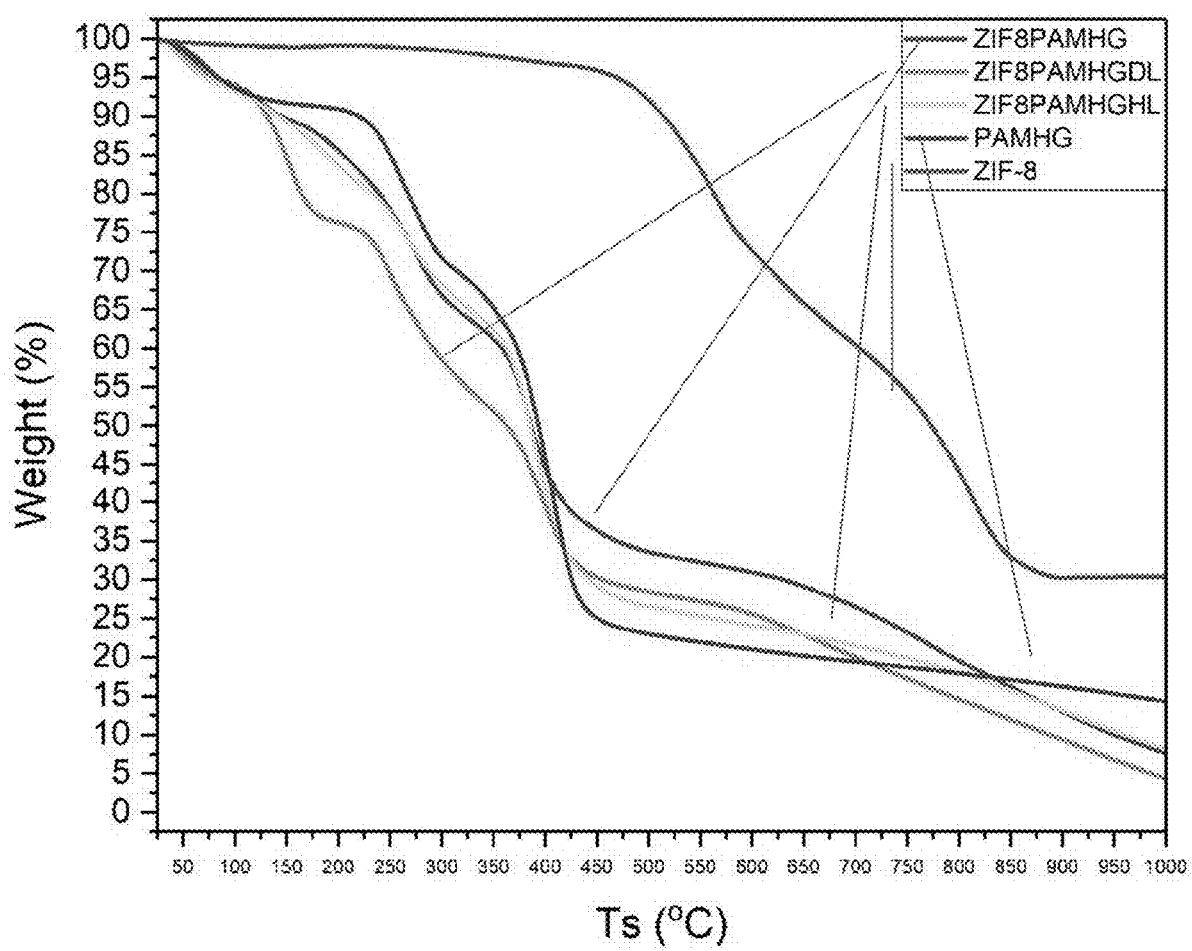
FIG. 12 depicts thermogravimetric analysis of pure PAM hydrogel (PAMHG, blue), pure ZIF-8 powder (ZIF-8, red), and ZIF-8 PAM hydrogel composite material (ZIF8PAMHG, purple). ZIF8PAMHGHL and ZIF8PAMHGDL, yellow and green, indicate the hydrogel composite material synthesized with half and double the amount of zinc and organic ligand reactants in solution, respectively.
Figure 13A:
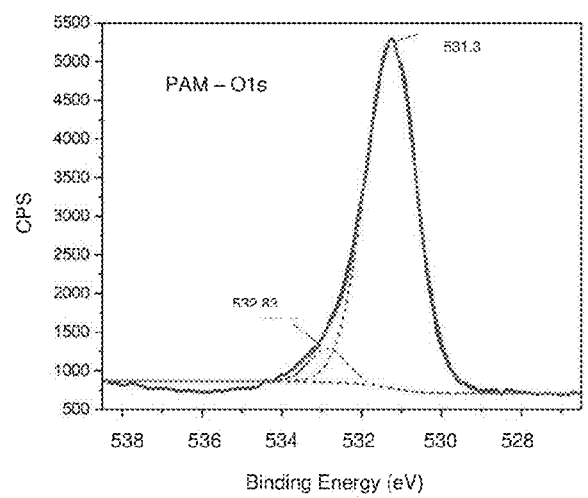
FIGS. 13A-13D depict high resolution XPS results for O1s signals of PAM (FIG. 13A), ZIF-8 (FIG. 13B), Zn-PAM hydrogel (FIG. 13C), and ZIF-8 PAM composite material (FIG. 13D).
Figure 13B:
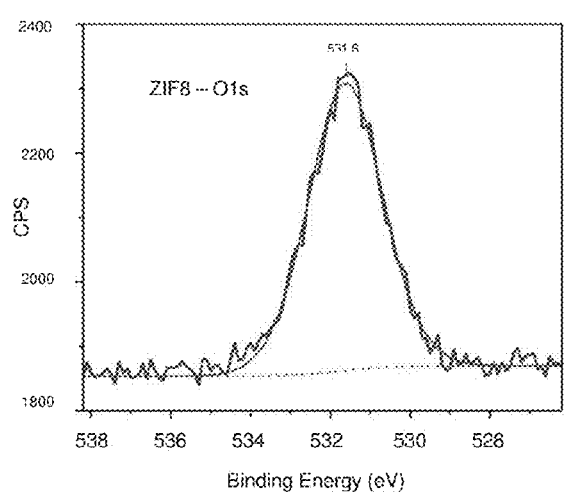
Figure 13C:
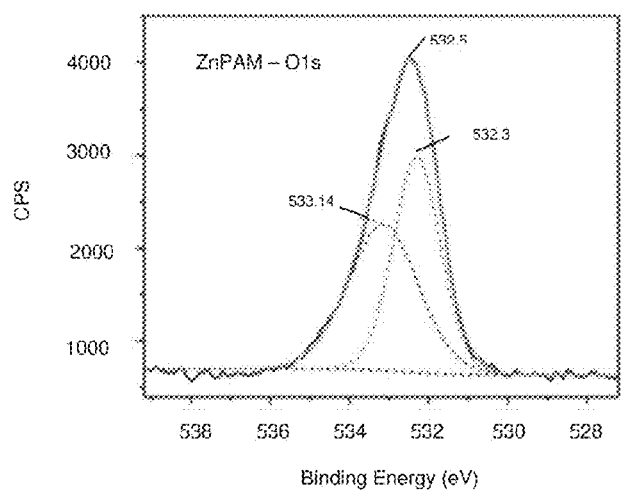
Figure 13D:
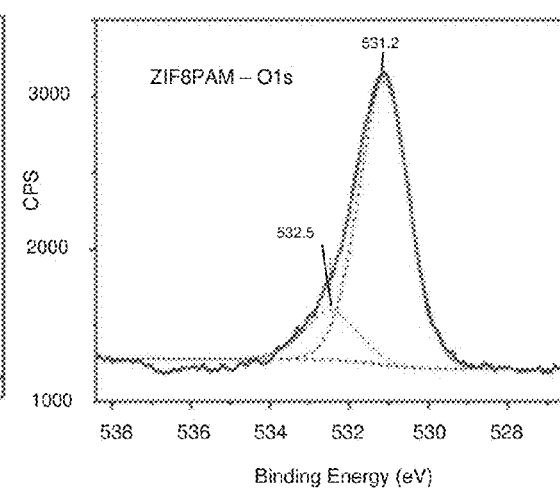

The ZIF-8 loading in the hydrogel composite material was determined by TGA to be 19.6±1.1% (FIG. 3b, Table 2). Reducing the amount of zinc and organic ligand reactants in the solutions by half led to a reduced ZIF-8 loading of 10.7±1.3% in the synthesized hydrogel composite material, while doubling the amount of reactants lead to a loading of 12.3±0.9% (FIG. 12). This suggested that the maximum loading in this system was around 20%, and that increasing the concentration of reactants does not increase the loading of ZIF-8 in the gel, possibly due to diffusion limitations and competing formation of ZIF-8 outside the gel matrix, as zinc may leak out of the pre-cursor gel when immersed in the ligand solution.

Figure 3D:
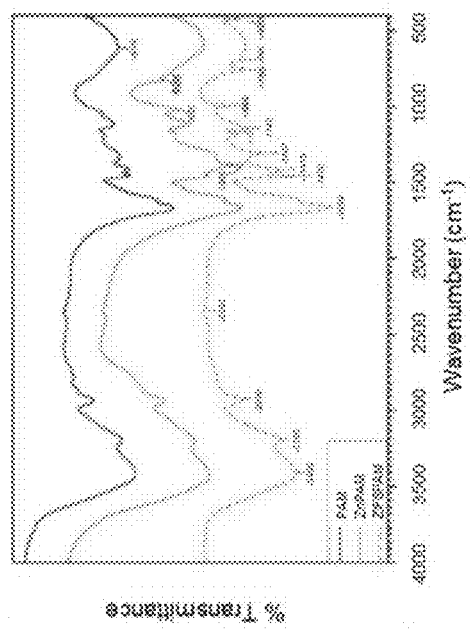
Figure 3A:
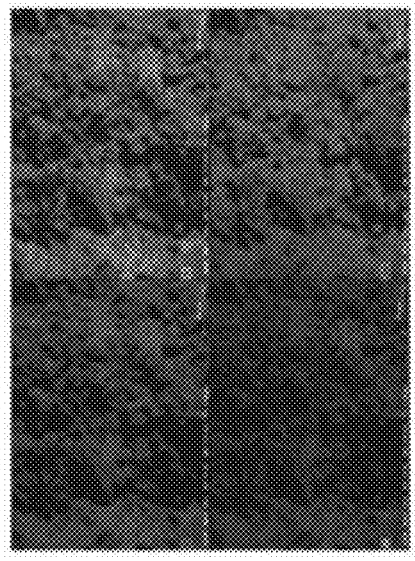
Figure 3C:
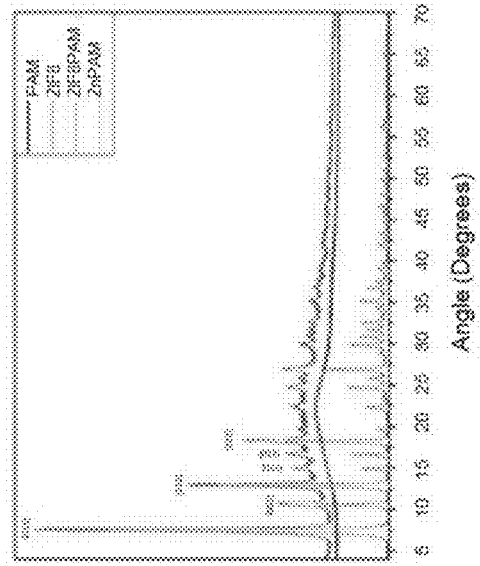
Figure 4A:
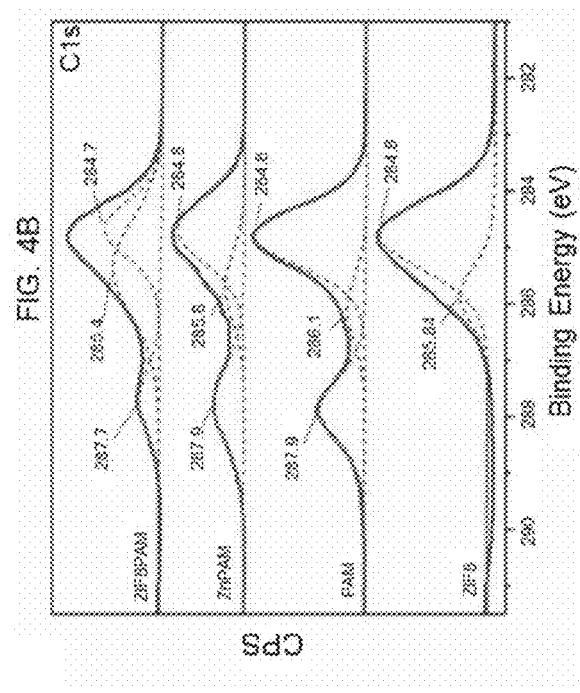
FIG. 4A-4D depict XPS wide scan spectra of polyacrylamide hydrogel, ZIF-8, ZnPAM, and ZIF-8 PAM hydrogel composite material (FIG. 4A); fine scan XPS results showing carbon C1s (FIG. 4B); nitrogen N1s (FIG. 4C); and zinc Zn2p (FIG. 4D) peaks for ZIF-8 PAM hydrogel composite material, ZnPAM hydrogel, pure ZIF-8, and pure PAM hydrogel.
Figure 4B:
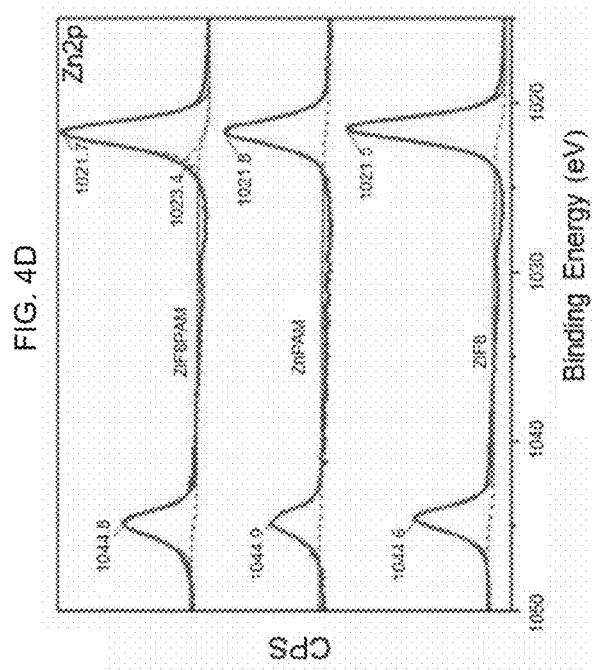
Figure 4C:
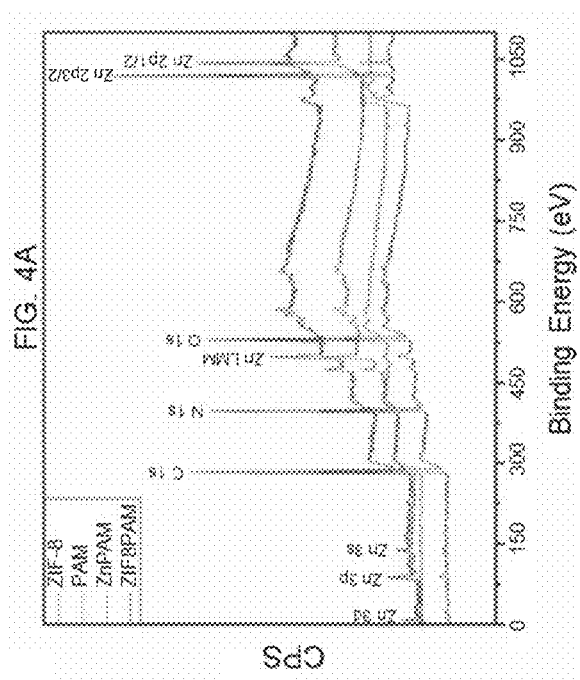
Figure 4D:
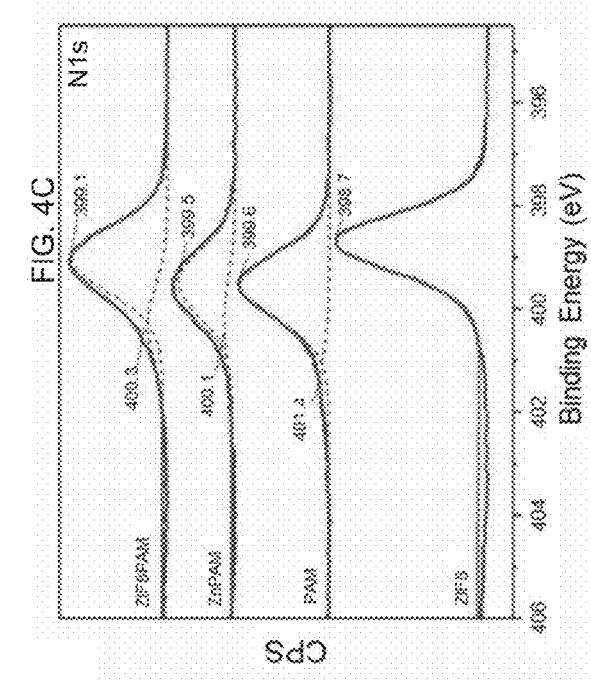

The crystal structure of the ZIF-8 in ZIF-8 PAM composite material was verified by powder XRD (FIG. 3c). XRD pattern showed the characteristic peaks at (011), (002), (112), (022), (013), and (222) in the ZIF-8 PAM composite material, consistent with the simulation of ZIF-8 crystals [Wang, Y.; Hou, P.; Wang, Z.; Kang, P., Chemphyschem 2017, 18 (22), 3142-3147]. As expected, the pure PAM hydrogel sample didn't exhibit any sharp peaks in its XRD results, but it did show a broad curve in the signal. This curved signal was replicated in the XRD results for the ZIF-8 PAM composite material, along with the peaks for the ZIF-8. The only difference between the XRD pattern of the Zn-PAM hydrogel and that of the PAM hydrogel was a small peak at an angle of around 8°, which could be ascribed to zinc hydroxide, indicating the presence of amorphous $Zn(OH)_2$ in the composite material [Li, J.; Cao, W.; Mao, Y.; Ying, Y.; Sun, L.; Peng, X., CrystEngComm 2014, 16 (42), 9788-9791, Hua, G.; Zhang, L.; Dai, J.; Hu, L.; Dai, S., Applied Physics A 2010, 102 (2), 275-280].

FTIR in FIG. 3d showed that there were two broad peaks centered at 3400 cm$^{-1}$ and 3195 cm$^{-1}$, respectively in the ZIF-8 PAM hydrogel composite material, which indicated the presence of primary amines (R—$NH_2$) as well as secondary amines (R—NH—R) as expected for the PAM hydrogel structure. These peaks showed redshift in Zn-PAM (+2.41 $cm^{-1}$) compared to pure PAM, possibly indicating some electronic transfer from zinc hydroxide to the nitrogen groups in PAM matrix. The peak at around 1659 $cm^{-1}$ was ascribed to the carboxylic group (C=O) of the PAM. The imidazole rings that make up the ZIF-8 in the composite material showed peaks at around 1415 $cm^{-1}$ for ring stretching, 1307 $cm^{-1}$ for the aromatic amine (HN—C), 760 $cm^{-1}$ and 693 $cm^{-1}$ for the aromatic carbon (C—H), and 420 $cm^{-1}$ for the amine zinc bond (Zn—NH). The Zn-PAM hydrogel contained peaks at 826 $cm^{-1}$ and 1022 $cm^{-1}$ which correspond to ZnOH bending mode [Srivastava, 0. K.; Secco, E. A., Canadian *Journal of Chemistry* 1967, 45 (6), 585-588], which supported the idea that $Zn(OH)_2$ forms as precursor molecules in the Zn-PAM hydrogel, which may act as seeds for the easy formation of ZIF-8 molecules.

XPS provides further information of the types of elements present in the ZIF-8 PAM hydrogel composite material and their electronic states (FIG. 4). The XPS spectra for the PAM hydrogel showed a peak for nitrogen (N 1s at 399.6 eV) which was attributed to amide nitrogen (HN—C=O), a peak for carbon (C 1s at 284.8 eV), and a peak for oxygen (O 1s at 531.3 eV), which was expected for the composition of PAM. In the case of the ZIF-8 powder, multiple strong peaks that indicated the presence of zinc were found at 9, 87, 137, 496, 1019.3, and 1042.3 eV, as well as peaks for N 1s (398.7 eV, FIG. 4c) and C 1s (284.8 eV, FIG. 4b) that were found in the imidazole ring which acted as the organic coordination ligand in ZIF-8. The same peaks present in the PAM hydrogel and ZIF-8 powder spectra were present in the spectra for the ZIF-8 PAM hydrogel composite material, suggesting the successful synthesis of the composite material (FIG. 4a). The doublet in the 950-1000 eV range was found in the pure PAM hydrogel, as well as the Zn-PAM hydrogel and composite material but not in the pure ZIF-8, which was due to the presence of oxygen (O KLL signal) in the chemical composition of the PAM gels. The zinc peaks found in the ZIF-8 powder spectra were also seen in the ZIF-8 PAM hydrogel composite material spectra. It was interesting to note differences between the spectra of the Zn-PAM hydrogel and the final ZIF-8 PAM hydrogel composite material. Both the Zn-PAM hydrogel and ZIF-8 PAM composite material spectra contained the major peaks for Zn2p ½, Zn2p 3/2, and Zn LMM, at 1040, 1020, and 496 eV, respectively. However, on the lower range of binding energies, the Zn-PAM sample was found to have two peaks at around 87 and 9 eV, for Zn3p and Zn3d respectively, while the ZIF-8 PAM composite material was found to have an extra peak at around 137 eV corresponding to Zn3s (FIG. 4a). The appearance of this peak pointed to the change in the electrochemical characteristics of the zinc after it coordinated with the nitrogen in the ZIF-8 PAM hydrogel composite material. Additionally, the fine scans of the oxygen peaks for the Zn-PAM composite material showed a shift to higher binding energies ranging from 532.3 to 533.1 eV (FIG. 13c), which was indicative of the presence of hydroxides, as the typical peak positions for the O1s in zinc oxides are found in the lower range of 530-531 eV [Strohmeier, B. R.; Evans, W. T.; Schrall, D. M., *Journal of Materials Science* 1993, 28 (6), 1563-1572, Duchoslav, J.; Steinberger, R.; Arndt, M.; Stifter, D., *Corrosion Science* 2014, 82, 356-361, Raven, M. S., *Surface and Interface Analysis* 1979, 1 (1), 20-25]. Fine scan analysis of the carbon signal showed the presence of a peak at 287.8±0.1 eV for the PAM hydrogel and ZIF-8 PAM composite material samples, which arose due to the carboxylic group (C=O) in the hydrogel chemistry (FIG. 4b). The deconvoluted C1s peaks of the ZIF-8 PAM composite material sample showed a slight shift to lower binding energies, which was due to the presence of more nitrogen-carbon bonds found in both the PAM hydrogel and the ZIF-8 crystals [Ronning, C.; Feldermann, H.; Merk, R.; Hofsass, H.; Reinke, P.; Thiele, J. U., *Physical Review B* 1998, 58 (4), 2207-2215]. The loading position of ZIF-8 crystals may be theorized based on the shifts in binding energy in the fine scans of N1 s. The shift to lower binding energies of N1s in the Zn-PAM hydrogel (−1.3 and −0.1 eV) or ZIF-8-PAM hydrogel composite material (−1.1 and −0.5 eV) compared to the PAM hydrogel (FIG. 4c) indicated the reduction of the primary and secondary amine groups due to interaction with $Zn(OH)_2$. This was evidenced by the shift to higher binding energies (+0.2 eV) of Zn2p in the ZIF-8 PAM composite material compared to the ZIF-8 crystals (FIG. 4d), as well as the redshift of amine peaks in FTIR (FIG. 3d). Atomic composition analysis found that the ZIF-8 PAM composite material contained 53.39% carbon, 21.21% nitrogen, 9.58% oxygen, and 15.83% zinc (Table 3). The Zn-PAM hydrogel was composed of 57.49% carbon, 14.98% nitrogen, 20.33% oxygen, and 7.21% zinc, which further supported the claim of the presence of zinc hydroxide in the Zn-PAM hydrogel due to the high concentration of oxygen in the sample.

Figure 5A:
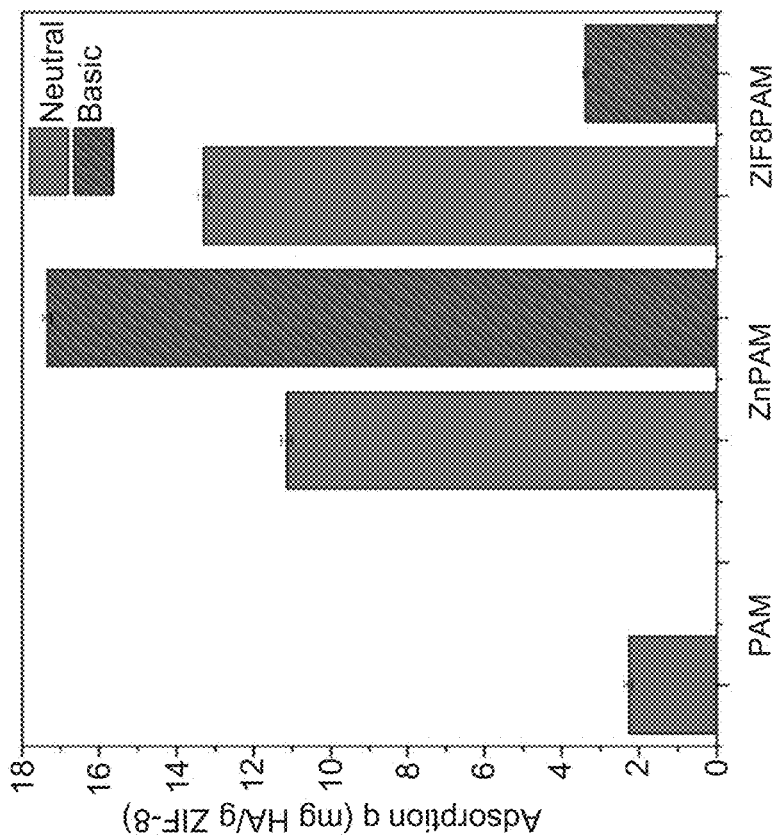
FIGS. 5A-5B graphically depict swelling ratios of the PAM hydrogel (PAM), Zn-PAM hydrogel (ZnPAM), and ZIF-8 PAM composite (ZIF8PAM) under neutral (pH=7, blue) and basic (pH=10, red stripped) conditions (FIG. 5A); adsorption capacity of HA (Co=20 mg/L) by the PAM hydrogel (PAM), Zn-PAM hydrogel (ZnPAM), and ZIF-8 PAM hydrogel composite (ZIF8PAM) under neutral (pH=7, blue) and basic (pH=10, red stripped) conditions (FIG. 5B).

ZIF-8 PAM Hydrogel (Entrapped MOF-Hydrogel Composite Material) Swelling and its Capability to Remove HA/Dyes The regular PAM hydrogel exhibited the highest swelling under the neutral condition, with a swelling ratio of 10.8±0.2, while the Zn-PAM hydrogel had the lowest swelling ratio at 4.1±0.1, which increased to 5.5±0.1 in the ZIF-8 PAM hydrogel composite material (FIG. 5a). Immersing the hydrogels in a basic aqueous solution of NaOH led to an increase in the swelling ratio of all the samples. The swelling ratio at pH 10 of the regular PAM hydrogel and the ZIF-8 PAM hydrogel composite material increased by a twofold (SW=20.3±0.4, and SW=11.7±0.1, respectively), while the swelling ratio of the composite Zn-PAM hydrogel only increased slightly (SW=4.5±0.1).

PAM hydrogels are known to be prone to hydrolysis of the amide groups when being immersed into strongly basic solutions. This leads to the presence of more carboxyl groups, which may expand the hydrogel matrix due to the repulsion of negative charges, attraction of more water molecules, and an ultimate increase in the swelling of the hydrogel [Begam, T.; Nagpal, A. K.; Singhal, R., *Journal of Applied Polymer Science* 2003, 89 (3), 779-786]. In the case of the Zn-PAM hydrogel under basic conditions, without wishing to be bound by theory, it was considered that the presence of positively charged zinc ions offset the effects of the negatively charged carboxyl groups that could appear due to hydrolysis of the amide groups, and that therefore not much change in the swelling of the composite was observed with an increase in pH. Whereas for the ZIF-8 PAM composite material, the ZIF-8 molecules were neutrally charged and couldn't offset the negative charges present in the gel matrix at higher pH.

Figure 14:
FIG. 14 depicts images of hydrogel composite materials after adsorption of humic acid for 7 days.
Figure 15:
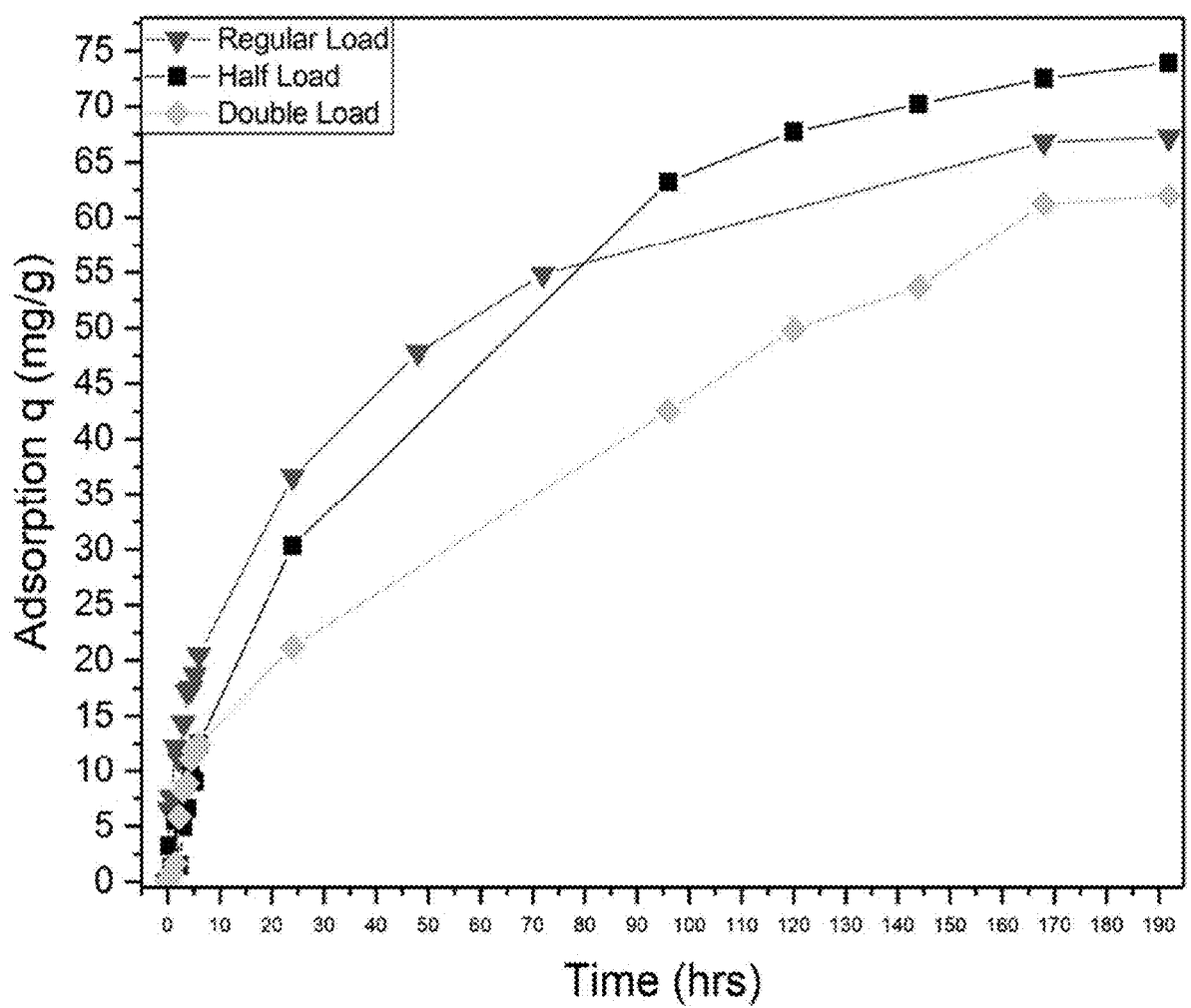
FIG. 15 graphically depicts time-dependent adsorption of humic acid ($C_o$=100 mg/L) by ZIF-8 PAM hydrogel composite materials containing the regular load of ZIF-8 (35.7±1.1%)(green curve), double the load of ZIF-8 (yellow curve), and half the load of ZIF-8 (black curve).
Figure 16:
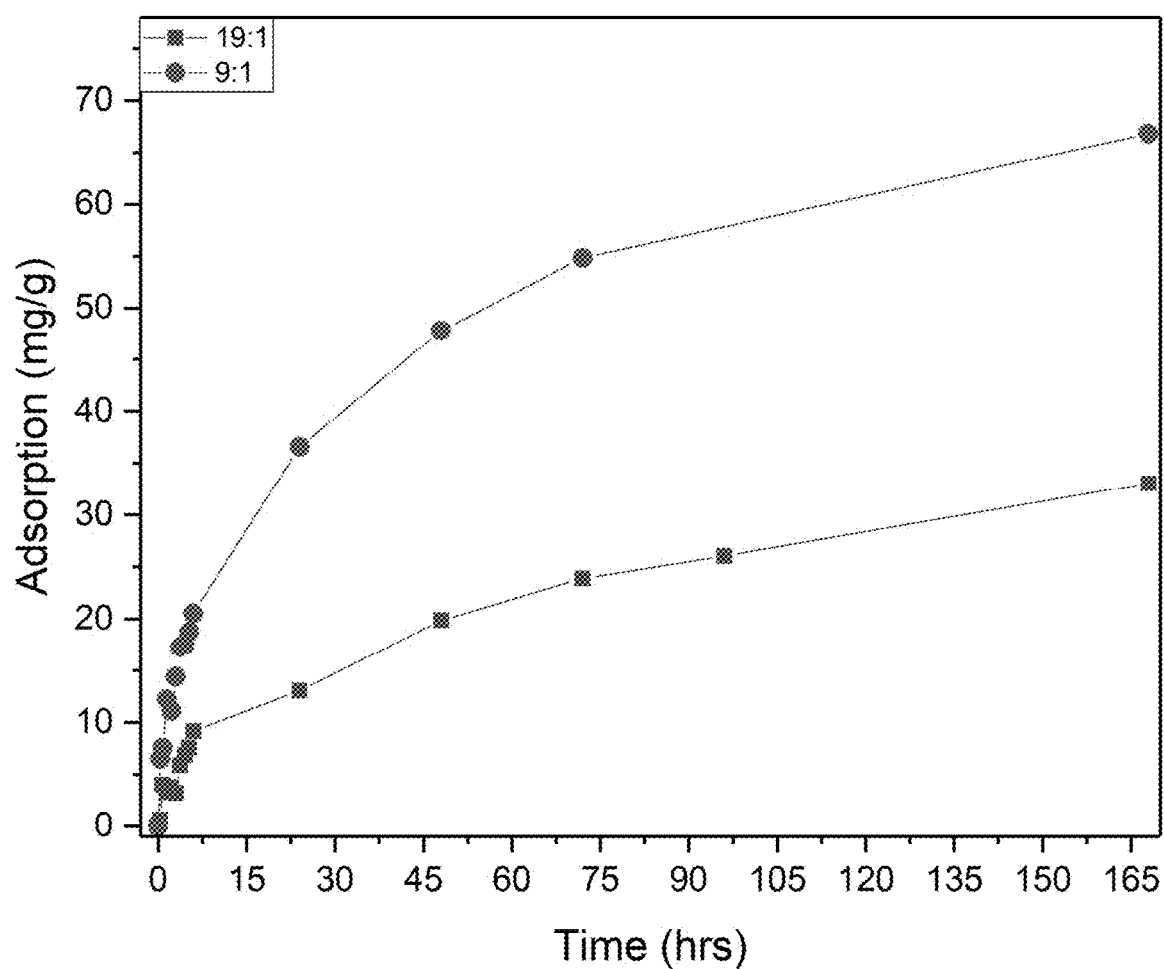
FIG. 16 graphically depicts time-dependent adsorption of humic acid ($C_o$=100 mg/L) by ZIF-8 PAM hydrogel composites containing a 9:1 ratio of monomer to cross-linker (red curve), and a 19:1 ratio of monomer to cross-linker (blue curve).

The effectiveness of the ZIF-8 PAM hydrogel composite material in purifying water contaminated by organic matter was evaluated by removal of HA or dyes in water. HA gave a dark brown color to solutions, which decreased as it was adsorbed into hydrogel composite materials, transferring its dark brown color to the hydrogel composite material samples (FIG. 14). Therefore it was possible to measure the adsorption of HA over time by measuring the ultraviolet and visible light absorption of the HA solution using UV-Vis spectroscopy. In order to fine tune and optimize the adsorption of HA, both the monomer to cross-linker ratio and the amount of ZIF-8 in the hydrogel was optimized and their maximum adsorption capacities were measured. Two composite materials using the monomer to cross-linker ratios of 9:1 (10% cross-linker), and 19:1 (5% cross-linker), were prepared, and it was found that the composite resulting from the 9:1 ratio was optimal for HA adsorption (FIG. 15). In the case of ZIF-8 loading, hydrogels loaded with half, regular, and double the amount of ZIF-8 were also tested, and it was found that the initial adsorption of HA was best in the hydrogels loaded with a regular amount (19.6±1.1%) of ZIF-8 (FIG. 16). Due to these findings, ZIF-8 PAM hydrogels prepared from a 9:1 monomer to cross-linker ratio, and a ZIF-8 loading of 19.6% were used for all subsequent adsorption experiments.

The optimized ZIF-8 PAM hydrogel composite materials were used to measure the adsorption of HA over time at different initial concentrations ranging from 10 to 175 mg/L. Contact time curves at different initial concentrations showed a rapid adsorption of HA in the beginning, then slow adsorption after 6 hours of contact with the ZIF-8 PAM composite material (FIG. 6a). This initial quick uptake of HA was due to the adsorption of the molecules onto the ZIF-8 present on the surface of the hydrogel. After that initial stage of adsorption, the HA in the solution needed to diffuse into the composite material to be adsorbed by the ZIF-8 crystals inside, effectively slowing down the rate of adsorption until a maximum capacity was reached. Increasing the initial concentration from 150 to 175 mg/L of HA led to very similar time dependent adsorption curves, therefore the maximum adsorption capacity of the ZIF-8 PAM composite material was assumed to be reached. The maximum adsorption capacity obtained at an initial concentration of 175 mg/L of HA after 7 days was 111.5±3.0 mg of HA per gram of ZIF-8. This adsorption capacity was much higher compared to the capacity of other materials used to adsorb HA, such as pure ZIF-8 (70.2 mg/g), amine-functional rice husk ash (8.2 mg/g), activated bentonite (10.75 mg/g), fly ash (10.7 mg/g), palygorskite (17 mg/g), nanoscale zerovalent iron (17 mg/g), polypyrrole-coated glass beads (0.4 mg/g), and zeolite/$TiO_2$ (5.9 mg/g) [Imyim, A.; Prapalimrungsi, E., *J Hazard Mater* 2010, 184 (1-3), 775-81, Doulia, D.; Leodopoulos, C.; Gimouhopoulos, K.; Rigas, F., *J Colloid Interface Sci* 2009, 340 (2), 131-41, Wang, S.; Zhu, Z. H., *J Colloid Interface Sci* 2007, 315 (1), 41-6, Wang, M.; Liao, L.; Zhang, X.; Li, Z., *Applied Clay Science* 2012, 67-68, 164-168, Giasuddin, A. B. M.; Kanel, S. R.; Choi, H., *Environmental Science & Technology* 2007, 41 (6), 2022-2027, Bai, R.; Zhang, X., *Journal of Colloid and Interface Science* 2001, 243 (1), 52-60, Liu, S.; Lim, M.; Amal, R., *Chemical Engineering Science* 2014, 105, 46-52].

Figure 6B:
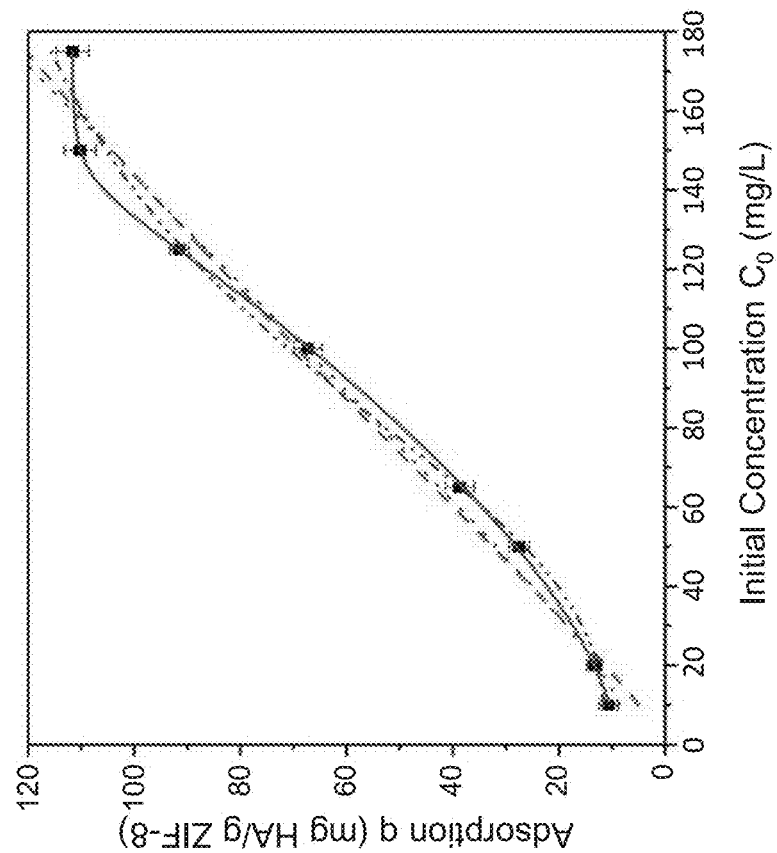
FIGS. 6A-6B graphically depict effect of contact time and initial concentration of humic acid on adsorption onto ZIF-8 PAM hydrogel composite materials. Initial concentrations ranged from 10 to 175 mg/L, contact time maximum was 7 days (FIG. 6A); isotherm obtained from maximum adsorption capacity after 7 days at each initial concentration, red dashed line represents Langmuir fit, blue dotted line represents Freundlich fit, purple dash-dotted line represents Hill model fit, and green solid line represents fitting with a five parameter logistic equation (FIG. 6B).
Figure 6A:
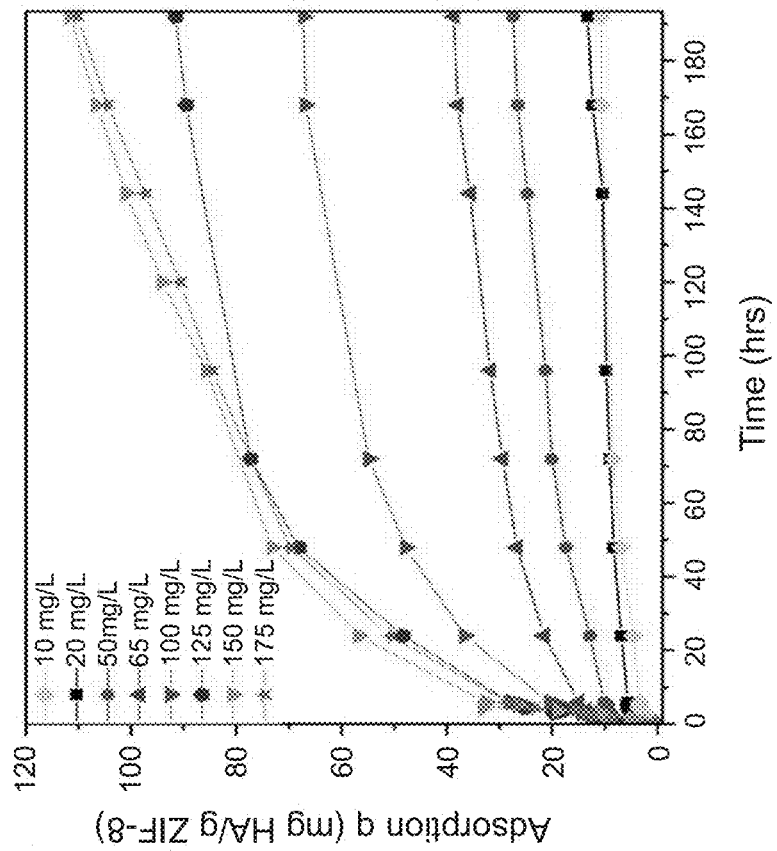

A qualitative inspection of the raw isotherm data in FIG. 6b suggested a Type IV or Type V isotherm for the adsorption of HA by the ZIF-8 PAM hydrogel. This type of isotherm implied an initial monolayer-multilayer adsorption as well as stronger adsorbate-adsorbate interactions compared to the adsorbate-adsorbent interactions [Kruk, M.; Jaroniec, M., *Chemistry of Materials* 2001, 13 (10), 3169-3183]. The isotherm data were also fitted with Langmuir (Equation (1)), Freundlich (Equation (2)), and Hill (Equation (3)) adsorption models, as well as by a mathematical logistic equation (Equation (4)). The results of the fitting analysis are summarized in Table 5. Out of the three adsorption models, the Hill equation described the adsorption process better ($R^2$=0.995), and it predicted a higher maximum adsorption capacity of 144.65±16.80 mg/g ZIF-8 may be achieved by the composite material. Fitting with the Hill model suggested a cooperative adsorptive process, in which the adsorption of a molecule on the surface of the adsorbent influences the adsorption of further adsorbates [Foo, K. Y.; Hameed, B. H., *Chemical Engineering Journal* 2010, 156 (1), 2-10].

Figure 5B:
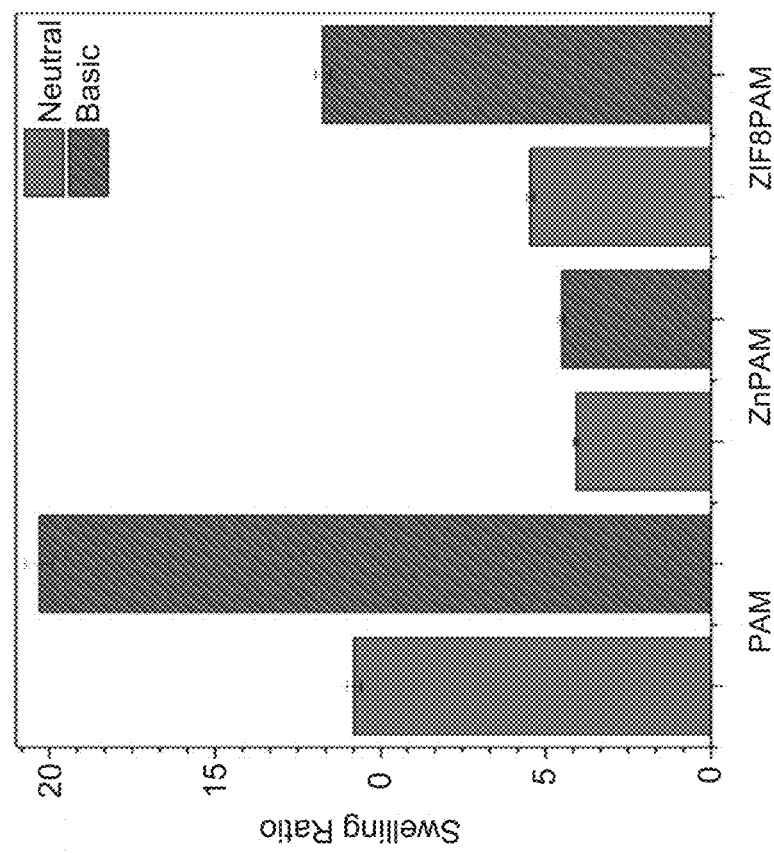
Figure 17:
FIG. 17 depicts images of aggregation and precipitation of humic acid in solutions that contained Zn-PAM hydrogel composite material.

The effects of solution basicity on the adsorption of HA was also tested, where the adsorbents were placed in a solution of 20 mg/L of HA under either neutral (pH=7) or basic conditions (pH=10). Under neutral conditions, the ZIF-8 PAM hydrogel composite material was found to have the highest adsorption capacity (13.31±0.15 mg/g), while the PAM hydrogel had the lowest adsorption capacity (2.28±0.10 mg/g) (FIG. 5b). Changing to basic conditions (pH 10) led to a significant decrease in the HA adsorption of both the regular PAM hydrogel and the ZIF-8 PAM hydrogel composite material, decreasing to 0 and 3.40±0.07 mg/g respectively. While the Zn-PAM hydrogel demonstrated a high capacity for HA removal in solution, it removed HA through a different mechanism as shown by the changes in the light absorption of the solutions. Instead of adsorbing the HA, the Zn-PAM hydrogel appeared to create an aggregation of HA particles which were then deposited to the bottom of the solution (FIG. 17). Therefore their efficiency in removing HA from solution cannot be compared to that of the adsorbing hydrogels, even though the Zn-PAM hydrogels showed the ability to precipitate 11.14±0.13 mg HA/g Zn-PAM under the neutral condition, and 17.34±0.11 mg HA/g Zn-PAM under the basic condition.

Figure 18:
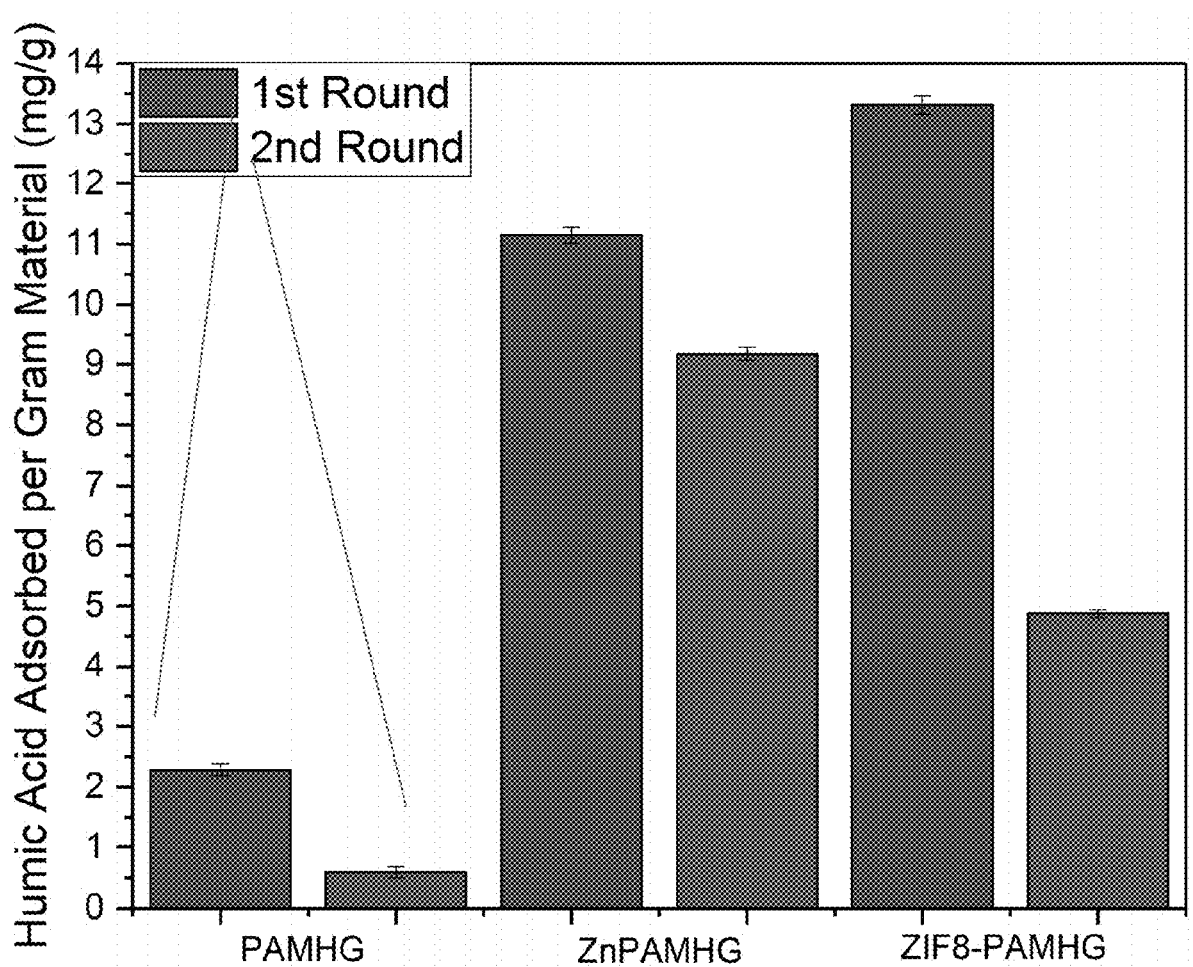
FIG. 18 graphically depicts adsorption capacity of humic acid (HA, $C_o$=20 mg/L) by the polyacrylamide hydrogel (PAM HG), Zn-polyacrylamide hydrogel (Zn-PAM HG), and ZIF-8 polyacrylamide hydrogel composite material (ZIF8-PAM HG) at neutral (pH=7) conditions, after the first round (blue), and after being reused in a second round (red).

The reusability of the material was also tested and it was found that the efficiency of the ZIF-8 PAM hydrogel composite material decreased by 63% (from 13.31±0.15 mg/g to 4.88±0.07 mg/g), while the efficiency of the regular PAM hydrogel decreased by 74%, and the Zn-PAM hydrogel by only 18% (FIG. 18).

Figure 7:
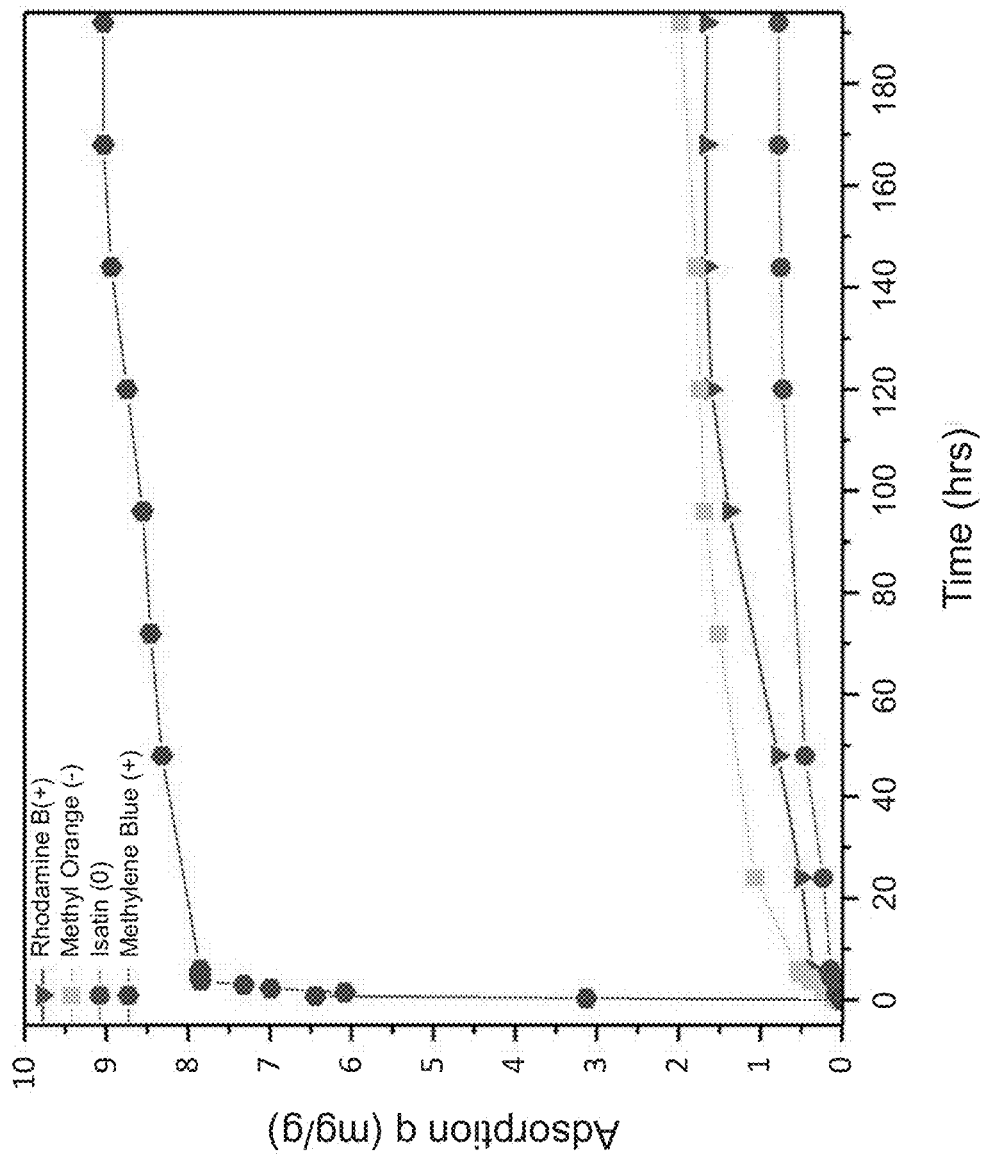
FIG. 7 graphically depicts time dependent adsorption of methylene blue (blue hexagons), rhodamine B (red triangles), isatin (green circles), and methyl orange (orange square) by ZIF-8 PAM hydrogel composite material after being placed in solutions containing 0.01 mM dye.
Figure 9A:
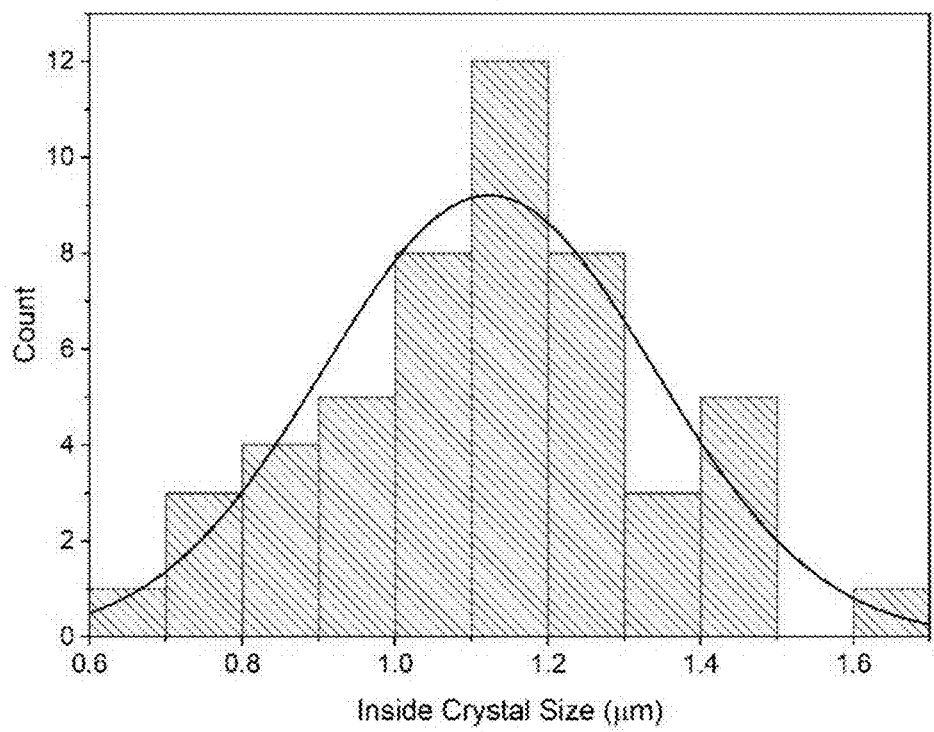
FIGS. 9A-9B depict size distribution of the length of ZIF-8 crystals found inside a PAM hydrogel (FIG. 9A), and on the surface of the PAM hydrogel (FIG. 9B).
Figure 9B:
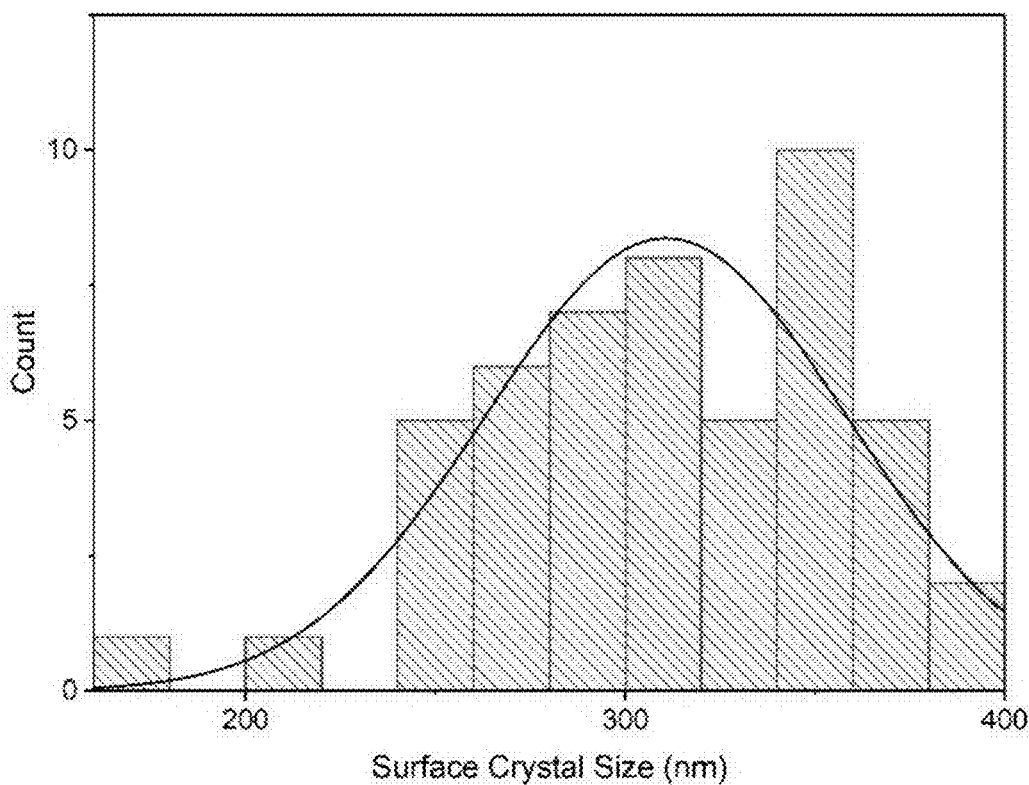
Figure 10A:
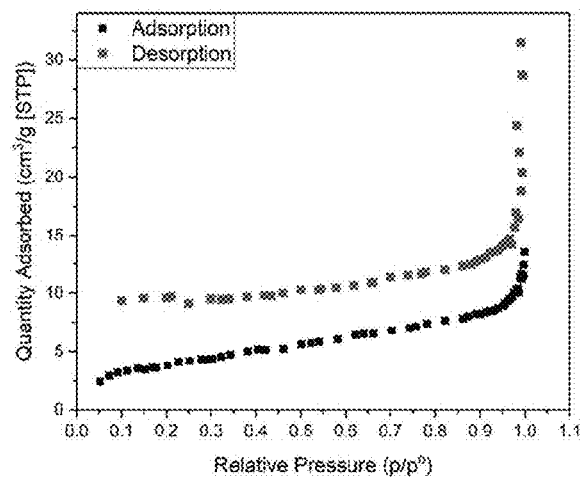
FIGS. 10A-10D depict nitrogen isotherms of ZIF-8 PAM hydrogel composite material (FIG. 10A), and pure PAM hydrogel (FIG. 10B); pore volume vs. average pore width plot for ZIF-8 PAM composite material (FIG. 10C), and the log derivative of that plot showing the distribution of pore sizes (FIG. 10D).
Figure 10B:
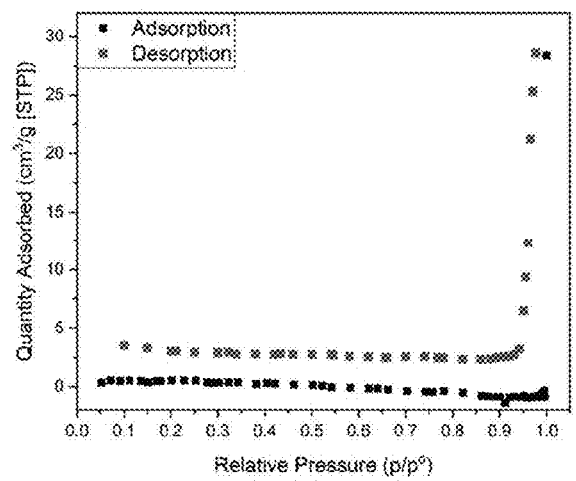
Figure 10C:
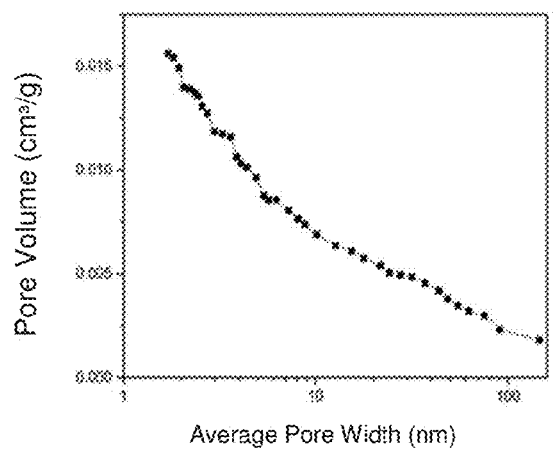
Figure 10D:
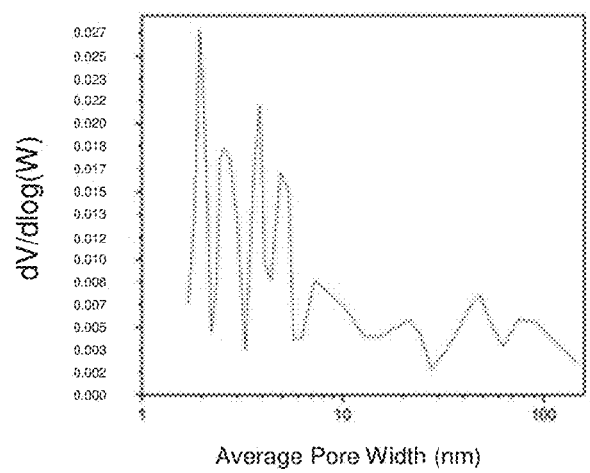

The adsorption tests for organic dyes showed that the maximum adsorption capacities of ZIF-8 PAM hydrogel composite materials for MO, RB, and IS were low at 1.97 mg/g, 1.66 mg/g, 0.78 mg/g, respectively (FIG. 7). However, the ZIF-8 PAM composite material showed higher adsorption capacity for MB, which had a maximum of 9.04 mg/g. The results for the adsorption of MO and MB were consistent with previously published work in which mesoporous ZIF-8 (pore size >2 nm) was found to be able to adsorb only 1.8 mg/g and 11.6 mg/g, respectively [Li, Y.; Zhou, K.; He, M.; Yao, J., *Microporous and Mesoporous Materials* 2016, 234, 287-292]. It was suggested that the interactions between the $Zn^{2+}$ of the ZIF-8 and the sulfur functional groups in the MB were major contributors to the adsorption efficiency [Feng, Y.; Li, Y.; Xu, M.; Liu, S.; Yao, J., *RSC Advances* 2016, 6 (111), 109608-109612]. Furthermore, it was considered that tuning of the size of ZIF-8 may play a role in dye adsorption since higher adsorption capacities for RB, MO and MB were reported with microporous (pore size <2 nm) ZIF-8 [Feng, Y.; Li, Y.; Xu, M.; Liu, S.; Yao, J., *RSC Advances* 2016, 6 (111), 109608-109612].

CONCLUSIONS

Herein described is an easy in-situ method for synthesizing a ZIF-8 PAM hydrogel composite material. Characterizations such as SEM, EDS, BET, TGA, XRD, FTIR, and XPS confirmed the successful formation of evenly dispersed mesoporous ZIF-8 crystals in a PAM hydrogel matrix and unveiled that the crystal nucleation happened by the interactions between Zn ion and nitrogen in the PAM matrix. The integrity and structure of the ZIF-8 crystals synthesized in the hydrogel matrix were similar to those reported in literature, while the properties of the PAM gel, such as the swelling ability, also remained intact. The composite material contained porous structure, with small nanopores (average 5.56±0.47 nm in diameter) from ZIF-8, and 20 to 90 nm pores (average 39.18±4.02 nm) from the PAM matrix. The ZIF-8 PAM hydrogel composite material demonstrated a maximum HA adsorption capacity of 111.5±3.0 mg/g ZIF-8. The HA adsorption isotherm fit with a Hill's adsorption model, suggesting a cooperative adsorption process and stronger influence of adsorbate-adsorbate interactions. It was found that the ZIF-8 PAM composite material was not able to adsorb any of the dyes regardless of their charge (MO, RB, or IS), except for the positively charged MB, which could be due to the presence of sulfur in MB. The ZIF-8 PAM hydrogel composite material showed improved adsorption efficiency for HA while at the same time having the benefits of easy synthesis, easier handling and operation compared to unsupported ZIF-8, and shapeable properties of the gel.

Table 1 delineates BET surface areas, pore volume, and pore size.

TABLE 1

BET surface areas, pore volume, and pore size

| | PAM Hydrogel | ZIF-8 PAM Hydrogel |
|---|---|---|
| Surface Area (m$^2$/g) | 1.6 | 14.4 |
| Pore Volume (cm$^3$/g) | 0.016 | 0.020 |
| Average Pore Size (nm) | 39.2 | 5.6 |

Table 2 delineates measured weight percentages of ZIF-8 in the PAM composite materials.

TABLE 2

Measured weight percentages of ZIF-8 in the PAM composite gels

| | Ash Content (%) | ZIF-8 Content(%)* |
|---|---|---|
| PAMHG | 20% | 0% |
| ZIF8PAMHG | 12.33 | 19.64 |
| ZIF8PAMHGHL | 12.58 | 10.72 |
| ZIF8PAMHGDL | 8.87 | 12.34 |

*Percent loading of ZIF-8 was calculated by taking into account the ash content of the plain PAM hydrogel in the composite hydrogel calculations.

Table 3 delineates atomic composition of elements found in ZIF-8 and PAM.

TABLE 3

Atomic composition of elements found in ZIF-8 and PAM.

| | Atomic Composition (%) | | | |
|---|---|---|---|---|
| | PAM | ZIF-8 | ZIF-8 PAM | Zn PAM |
| O1s | 19.49 | 0 | 9.58 | 20.33 |
| C1s | 62.4 | 48.94 | 53.39 | 57.49 |
| N1s | 18.1 | 22.34 | 21.21 | 14.98 |
| Zn 2p | 0 | 3.2 | 1.97 | 0.68 |
| Zn 2p1/2 | 0 | 4.64 | 2.75 | 0.72 |
| Zn 3s | 0 | 5.81 | 2.54 | 0 |
| Zn 3p | 0 | 6.3 | 3.42 | 1.13 |
| Zn 3d | 0 | 8.76 | 5.15 | 4.68 |
| Total Zn | 0 | 28.71 | 15.83 | 7.21 |

Table 4 delineates XPS peak positions.

TABLE 4

XPS Peak Positions

| | PAM | ZIF-8 | Zn PAM | ZIF-8 PAM |
|---|---|---|---|---|
| C1s | 284.8 | 284.8 | 284.8 | 284.7 |
| | 286.1 | 285.8 | 285.8 | 285.4 |
| | 287.9 | — | 287.9 | 287.7 |
| N1s | 399.6 | 398.7 | 399.5 | 399.1 |
| | 401.4 | — | 400.1 | 400.3 |
| O1s | 531.3 | 531.6 | 532.3 | 531.2 |
| | 532.8 | — | 533.1 | 532.5 |
| Zn2p | — | 1021.5 | 1021.8 | 1021.7 |
| | — | 1044.6 | 1044.9 | 1044.8 |

Table 5 delineates an isotherm modeling summary.

TABLE 5

Isotherm Modeling Summary

| Model | Parameter | |
|---|---|---|
| Langmuir | $q_{ml}$ (mg/g) | 529.412 |
| | $K_L$ (L/mg) | 6.075E−4 |
| | $R^2$ | 0.978 |
| Freundlich | $K_F$ ((mg/g)(L/mg)$^{1/n}$) | 0.548 |
| | 1/n | 1.047 |
| | $R^2$ | 0.980 |
| Hill | $q_{mh}$ (mg/g) | 144.652 |
| | $q_o$ (mg/g) | 11.388 |
| | $K_h$ (mg/L) | 108.207 |
| | $R^2$ | 0.995 |
| 5 parameter Logistic | $q_{m5}$ (mg/g) | 111.636 |
| | $q_o$ (mg/g) | 9.024 |
| | $C_o$ (mg/L) | 142.889 |
| | a | 26.400 |
| | b | 0.061 |
| | $R^2$ | 0.9998 |

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

All publications, patents and patent applications mentioned in this Specification are indicative of the level of skill those skilled in the art to which this invention pertains and are herein incorporated by reference to the same extent as if each individual publication patent, or patent application was specifically and individually indicated to be incorporated by reference.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

The invention claimed is:

1. A method of preparing a metal organic framework (MOF) composite material, the method comprising:
    providing a metal precursor, a cross-linker, and a hydrogel monomer;
    polymerizing the hydrogel monomer in the presence of the metal precursor and the cross-linker to form an entrapped metal-hydrogel composite material; and exposing the entrapped metal-hydrogel composite material to an organic ligand to form an entrapped MOF-hydrogel composite material.

2. The method of claim 1, wherein providing the metal precursor, the cross-linker, and the hydrogel monomer comprises:
providing the metal precursor, the cross-linker, and the hydrogel monomer in a solution, and
degassing the solution.

3. The method of claim 2, wherein degassing the solution comprises degassing the solution under vacuum.

4. The method of claim 2, wherein the solution is an aqueous solution.

5. The method of claim 1, wherein polymerizing the hydrogel monomer in the presence of the metal precursor and the cross-linker comprises polymerizing the hydrogel monomer by free radical polymerization.

6. The method of claim 1, wherein:
a) the metal precursor is a zinc precursor, a copper precursor, an iron precursor, or a combination thereof;
b) the cross-linker is bis-acrylamide, piperazine di-acrylamide, diallyl-tartardiamide, dihydroxyethylene bis-acrylamide, bis-acrylylcystamine, or a combination thereof;
c) the hydrogel monomer is acrylamide, acrylonitrile, acryloxyethyltrimethyl ammonium chloride (DAC), methacryloxyethyltrimethyl ammonium chloride (DMC), dimethyldiallyammonium chloride (DMDAAC), sodium acrylate (SAA), or 2-acylamido-2-methyl propane sulfonic acid (AMPS);
d) the organic ligand is 2-methylimidazole (Hmim), trimesic acid, or a combination thereof;
e) the entrapped metal-hydrogel composite material comprises zinc hydroxide polyacrylamide, copper polyacrylamide, iron (III) polyacrylamide, zinc hydroxide polyacrylonitrile, copper polyacrylonitrile, iron (III) polyacrylonitrile, zinc hydroxide poly(acryloxyethyltrimethyl ammonium chloride), copper poly(acryloxyethyltrimethyl ammonium chloride), iron (III) poly(acryloxyethyltrimethyl ammonium chloride), zinc hydroxide poly(methacryloxyethyltrimethyl ammonium chloride), copper poly(methacryloxyethyltrimethyl ammonium chloride), iron (III) poly(methacryloxyethyltrimethyl ammonium chloride), zinc hydroxide poly(dimethyldiallyammonium chloride), copper poly(dimethyldiallyammonium chloride), iron (III) poly(dimethyldiallyammonium chloride), zinc hydroxide sodium polyacrylate, copper sodium polyacrylate, iron (III) sodium polyacrylate, zinc hydroxide poly(2-acylamido-2-methyl propane sulfonic acid, copper poly(2-acylamido-2-methyl propane sulfonic acid, iron (III) poly(2-acylamido-2-methyl propane sulfonic acid, or a combination thereof; and/or
f) the MOF is zeolitic imidazolate framework 8 (ZIF-8), or Hong Kong University of Science and Technology MOF (HKUST-1), or MIL-100(Fe), or a combination thereof.

7. A metal organic framework (MOF) composite material comprising:
a hydrogel, wherein the hydrogel is polyacrylamide, polyacrylonitrile, poly(acryloxyethyltrimethyl ammonium chloride), poly(methacryloxyethyltrimethyl ammonium chloride), poly(dimethyldiallyammonium chloride), sodium polyacrylate, poly(2-acylamido-2-methyl propane sulfonic acid), or co-polymers thereof; and
a metal organic framework (MOF);
the MOF being entrapped in the hydrogel.

8. The composite material of claim 7, wherein
the MOF is zeolitic imidazolate framework 8 (ZIF-8), or Hong Kong University of Science and Technology MOF (HKUST-1), or MIL-100(Fe), or a combination thereof.

9. The composite material of claim 7, wherein the MOF being entrapped in the hydrogel comprises the MOF being retained within the matrix of the hydrogel and/or associated with the surface of the hydrogel.

10. The composite material of claim 9, wherein the MOF being retained within the matrix of the hydrogel comprises the MOF being retained via physical entanglement with the matrix of the hydrogel and/or the surface of the hydrogel; or through an intermolecular attractive force between the MOF and the matrix of the hydrogel and/or the surface of the hydrogel.

11. The composite material of claim 9, wherein the MOF being associated with the surface of the hydrogel comprises the MOF being retained within the matrix of the hydrogel and/or deposited on the surface of the hydrogel.

12. A metal organic framework (MOF)-composite material comprising the reaction product of:
an entrapped metal-hydrogel composite material; and
an organic ligand;
wherein the entrapped metal-hydrogel composite material comprises the reaction product of a metal precursor, a cross-linker, and a hydrogel monomer.

13. The composite material of claim 12, wherein:
a) the metal precursor is a zinc precursor, a copper precursor, an iron precursor, or a combination thereof;
b) the cross-linker is bis-acrylamide, piperazine di-acrylamide, diallyl-tartardiamide, dihydroxyethylene bis-acrylamide, bis-acrylylcystamine, or a combination thereof; and/or
c) the hydrogel monomer is acrylamide, acrylonitrile, acryloxyethyltrimethyl ammonium chloride (DAC), methacryloxyethyltrimethyl ammonium chloride (DMC), dimethyldiallyammonium chloride (DMDAAC), sodium acrylate (SAA), or 2-acylamido-2-methyl propane sulfonic acid (AMPS).

14. The composite material of claim 13, wherein the metal precursor is zinc nitrate hexahydrate, copper nitrate trihydrate, iron (III) chloride hexahydrate, or a combination thereof.

15. The composite material of claim 12, wherein the organic ligand is 2-methylimidazole (Hmim), trimesic acid, or a combination thereof.

16. The composite material of claim 12, wherein the hydrogel is polyacrylamide, polyacrylonitrile, poly(acryloxyethyltrimethyl ammonium chloride), poly(methacryloxyethyltrimethyl ammonium chloride), poly(dimethyldiallyammonium chloride), sodium polyacrylate, poly(2-acylamido-2-methyl propane sulfonic acid), or co-polymers thereof.

17. The composite material of claim 12, wherein the MOF is zeolitic imidazolate framework 8 (ZIF-8), Hong Kong University of Science and Technology MOF (HKUST-1), MIL-100(Fe), or a combination thereof.

18. A method of using the composite material of claim 7 to absorb a pollutant, the method comprising:
contacting the composite material with a mixture comprising the pollutant;
absorbing at least a portion of the pollutant into the composite material; and
removing the composite material comprising the absorbed pollutant from the mixture.

19. The method of claim 18, wherein the pollutant is an organic compound or a heavy metal.

* * * * *